(12) United States Patent
Randall

(10) Patent No.: US 12,110,943 B2
(45) Date of Patent: Oct. 8, 2024

(54) MODULAR ACTIVE VALVE SYSTEM HAVING A REDUCED FOOTPRINT FOR USE IN A SMALLER SHOCK PLATFORM

(71) Applicant: Fox Factory, Inc., Duluth, GA (US)

(72) Inventor: Connor Randall, Salida, CA (US)

(73) Assignee: Fox Factory, Inc., Duluth, GA (US)

( * ) Notice: Subject to any disclaimer, the term of this patent is extended or adjusted under 35 U.S.C. 154(b) by 541 days.

(21) Appl. No.: 17/071,750

(22) Filed: Oct. 15, 2020

(65) Prior Publication Data

US 2021/0108696 A1   Apr. 15, 2021

Related U.S. Application Data

(60) Provisional application No. 62/915,383, filed on Oct. 15, 2019.

(51) Int. Cl.
*F16K 31/122* (2006.01)
*F16F 9/19* (2006.01)
(Continued)

(52) U.S. Cl.
CPC .............. *F16F 9/34* (2013.01); *F16F 9/19* (2013.01); *F16F 9/50* (2013.01); *F16K 31/406* (2013.01); *B60G 13/08* (2013.01); *B60G 17/08* (2013.01); *B60G 2202/24* (2013.01); *B60G 2206/41* (2013.01); *B60G 2500/114* (2013.01); *B60G 2600/182* (2013.01); *B60G 2800/162* (2013.01); *F16F 2222/12* (2013.01); *F16F 2228/066* (2013.01); *F16F 2230/00* (2013.01); *F16F 2230/18* (2013.01); *F16F 2230/38* (2013.01); *F16F 2232/08* (2013.01); *F16F 2234/02* (2013.01)

(58) Field of Classification Search
CPC ........ F16F 9/19; F16F 9/34; F16F 9/50; F16F 2222/12; F16F 2230/00; F16F 2230/18; F16F 2230/38; F16F 2232/08; F16F 2228/00; F16K 31/406; B60G 13/08; B60G 17/08; B60G 2202/24; B60G 2206/41; B60G 2500/114; B60G 2600/182; B60G 2800/162
USPC ......... 188/266.2–266.5, 267.1, 267.2, 322.2, 188/322.21
See application file for complete search history.

(56) References Cited

U.S. PATENT DOCUMENTS 3,986,118 A   10/1976   Madigan
4,030,580 A   6/1977    Glaze
(Continued)

FOREIGN PATENT DOCUMENTS

CN   1656325 A    8/2005
CN   102859228 A  1/2013
(Continued)

OTHER PUBLICATIONS

Canadian First Office Action for Canadian Application No. 3,156,409, 4 Pages, Sep. 5, 2023.
(Continued)

*Primary Examiner* — Christopher P Schwartz

(57) ABSTRACT

A modular active valve system having a reduced footprint for use in a smaller shock platform is disclosed. The modular active valve system includes a multi-stage valve having a first stage and at least a second stage, wherein at least the first stage includes a semi-active valve for electronic damping control.

6 Claims, 19 Drawing Sheets

(51) Int. Cl.
*F16F 9/34* (2006.01)
*F16F 9/50* (2006.01)
*F16K 31/40* (2006.01)
*B60G 13/08* (2006.01)
*B60G 17/08* (2006.01)

(56) References Cited

U.S. PATENT DOCUMENTS

| | | | | |
|---|---|---|---|---|
| 5,048,861 A * | 9/1991 | Takahashi | ............ | B60G 17/018 |
| | | | | 188/266.2 |
| 5,952,823 A | 9/1999 | Sprecher et al. | | |
| 6,302,248 B1 * | 10/2001 | Nakadate | ................ | F16F 9/466 |
| | | | | 188/266.6 |
| 8,627,932 B2 | 1/2014 | Marking | | |
| 8,857,580 B2 | 10/2014 | Marking | | |
| 9,033,122 B2 | 5/2015 | Ericksen et al. | | |
| 9,120,362 B2 | 9/2015 | Marking | | |
| 9,239,090 B2 | 1/2016 | Marking et al. | | |
| 9,353,818 B2 | 5/2016 | Marking | | |
| 2006/0289258 A1 * | 12/2006 | Fox | ......................... | F16F 9/512 |
| | | | | 188/316 |
| 2011/0214956 A1 | 9/2011 | Marking | | |
| 2014/0353099 A1 * | 12/2014 | Yamashita | .............. | F16F 9/465 |
| | | | | 188/314 |
| 2015/0081171 A1 * | 3/2015 | Ericksen | ............... | F16F 9/5126 |
| | | | | 701/37 |
| 2015/0354659 A1 * | 12/2015 | Yamazaki | ............ | F16F 9/5126 |
| | | | | 188/280 |
| 2016/0059664 A1 | 3/2016 | Tucker et al. | | |
| 2016/0069471 A1 * | 3/2016 | Ewers | ....................... | F16K 1/00 |
| | | | | 137/489 |
| 2019/0203798 A1 | 7/2019 | Cox et al. | | |

FOREIGN PATENT DOCUMENTS

| | | |
|---|---|---|
| EP | 2939857 A2 | 11/2015 |
| JP | 2009014090 A | 1/2009 |
| KR | 20020037202 A | 5/2002 |
| KR | 20150082844 A | 7/2015 |
| KR | 2152017 B1 * | 9/2020 ................ F16F 9/34 |

OTHER PUBLICATIONS

Chinese First Office for CN Application No. 202080072491.4, 22 pages, Mailed Nov. 28, 2023.
European Search Report for EP Application No. 20877669.0, 7 pages, Mailed Oct. 17, 2023.
ISA/KR, International Preliminary Report on Patentability for International Application No. PCT/US2020/055854, Apr. 28, 2022, 7 Pages.
ISA/KR, International Search Report and Written Opinion for International Application No. PCT/US2020/055854, Jan. 29, 2021, 13 Pages.
Chinese Second Office Action for CN Application No. 202080072491.4, 24 pages, Mailed May 31, 2024.

\* cited by examiner

MODULAR ACTIVE VALVE SYSTEM HAVING A REDUCED FOOTPRINT FOR USE IN A SMALLER SHOCK PLATFORM

CROSS-REFERENCE TO RELATED APPLICATION (PROVISIONAL)

This Application claims priority to and benefit of copending U.S. Provisional Patent Application No. 62/915,383 filed on Oct. 15, 2019, entitled "A Modular Active Valve System Having A Reduced Footprint For Use In A Smaller Shock Platform" by Connor Randall, and assigned to the assignee of the present application, the disclosure of which is hereby incorporated by reference in its entirety.

FIELD OF THE INVENTION

Embodiments of the invention generally relate to methods and apparatus for use in vehicle suspension.

BACKGROUND OF THE INVENTION

Vehicle suspension systems typically include a spring component or components and a damping component or components that form a suspension to provide for a comfortable ride, enhance performance of a vehicle, and the like. For example, a harder suspension is usually preferred on a smooth surface while a softer suspension is often the choice for an off-road environment. Thus, there is no single universal setting, instead, the suspension system is almost always a collection of compromises to obtain the best performance over a range of different possible encounters. As with every collection of compromises, an advancement in one area almost always incurs a new problem or set of problems that require further advancement, analysis, and invention.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

In one embodiment, a pilot valve (e.g., a solenoid type pilot valve) has a coil in the upper region and an armature. The coil is used to provide a magnetic loop that is used to move the armature up and down. The movement of the armature acts as a spool to vary the flow through the port, e.g., open, close, or partially open or close the port.

The size of the port dictates the maximum flow. Thus, if it is a smaller port, there is less maximum flow than a larger port. Therefore, when the port is being used to adjust the damping, the smaller the port size with the smaller maximum flow results in a smaller range of damping control than a larger port size with a larger maximum flow rate.

In a single stage valve, in order to provide an appropriate range of damping control, a larger coil is used in conjunction with a larger armature and a larger port size (e.g., diameter P). However, the use of the larger coil, larger port, and larger armature results in a valve footprint of a first size (f) thereby causing a first dead space length (ds). As such, there is a certain port diameter (P1) and component size that is necessary for a desired damping control range, any reduction in port diameter (P1−Δd) and component size will reduce the damping control range of the valve.

Figure 3:
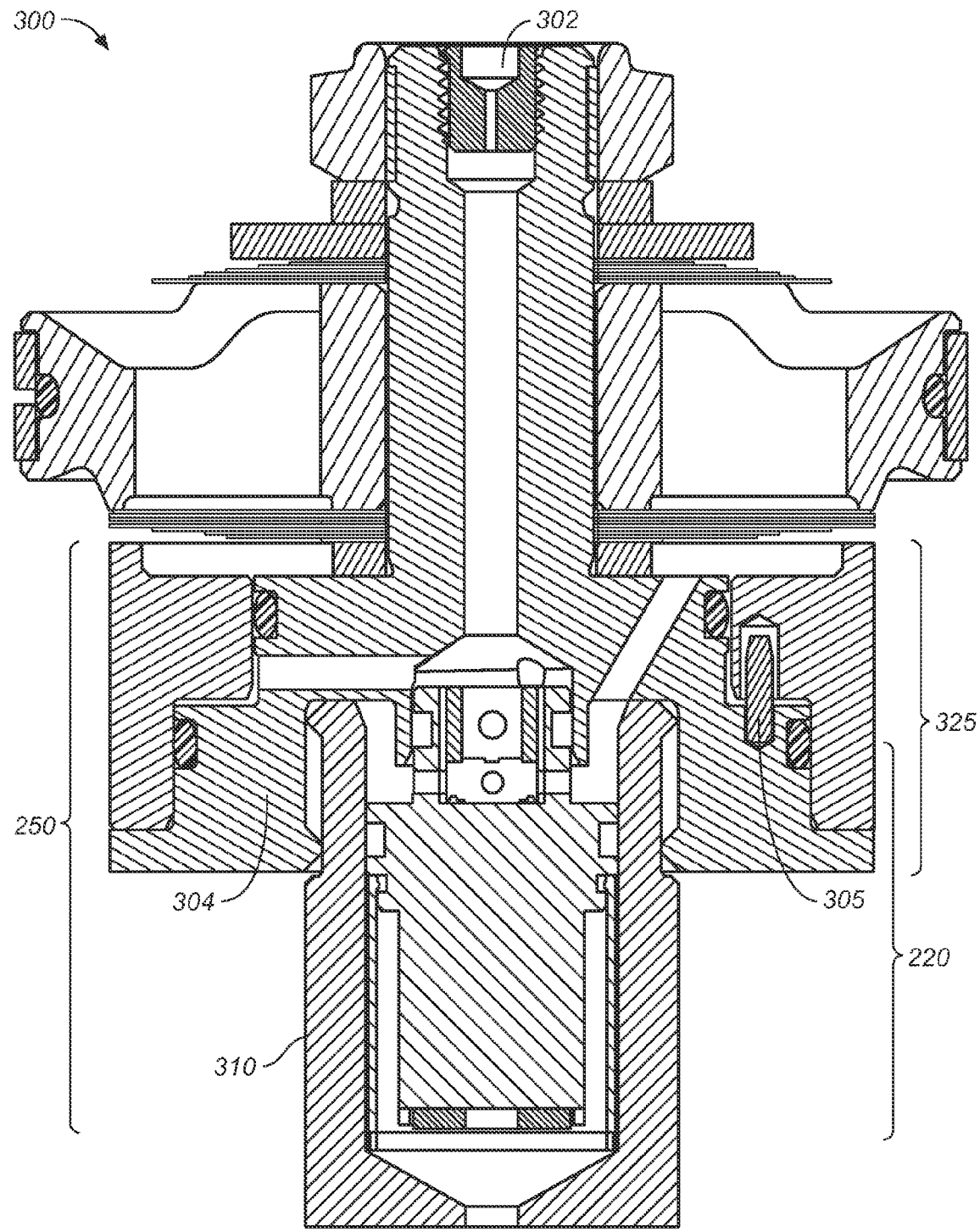
FIG. 3 is a side section view of a modular active valve system in a main piston valve configuration, in accordance with an embodiment.
Figure 11:
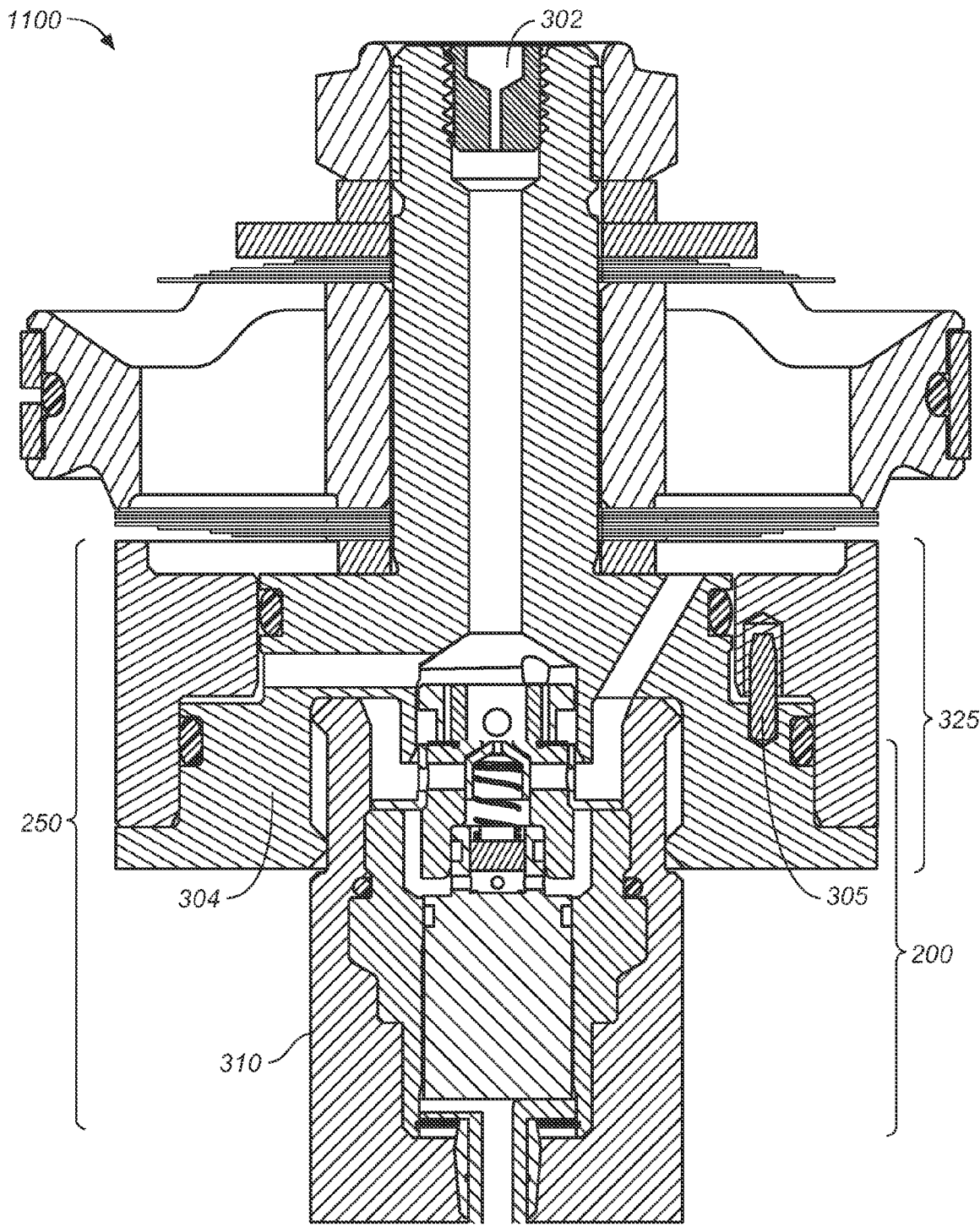
FIG. 11 is a side section view of a three section modular valve system in a main piston valve configuration, in accordance with an embodiment.

In contrast, in the disclosed modular valve (e.g., a multi-stage valve), the active pilot valve 220 is used to control the pressure that acts on the main stage (e.g., the main relief valve 210 of FIG. 11, or boost cylinder 325 of FIG. 3). Since the active pilot valve is only controlling pressure on the main stage, the flow rate (and therefore the port diameter P2) can be much smaller than a comparable single stage valve P1 providing the same damping control range. In other words, the small amount of flow is used to regulate the pressure applied to the main valve (e.g., the boost cylinder or the pilot valve) where the damping is controlled.

In one embodiment, the multi-stage valve will be able to use a smaller coil, smaller port, and smaller armature to obtain a similar (or an even larger) damping range than a single stage valve. Thus, the multi-stage valve with a similar damping range to a single stage valve will have a footprint (f2) that is smaller than the footprint f of the single stage valve and similarly a dead space length (ds2) that is smaller than the ds of the single stage.

Because of the smaller size of the multi-stage active valve, it can be used in place of a single stage valve in applications that require a smaller footprint while maintaining a similar damping control range.

In one embodiment, the damper is modular such that it can be used with preexisting components of a similar sized damper. In one embodiment, the only modification to the damper would be the replacement of a base valve with the multi-stage base valve, the addition of the multi-stage valve and a new shaft to work as an active main piston, or a combination thereof In one embodiment, the rest of the shock body remains modular.

In one embodiment, multi-stage active valve is used in a modal situation (e.g., a straight current sent to valves), or in a semi-active situation, e.g., various sensor input that is provided to an electronic control unit (ECU). The multi-stage active valve could be solenoid controlled such as an on/off solenoid. In one embodiment, the active valve is solenoid controlled with an infinitely adjustable range.

In one embodiment, one or more multi-stage active valves are used in a number of different shocks on a vehicle suspension. In so doing, the multi-stage active valves will provide independent control for a number of shocks.

In one embodiment, the multi-stage active valve in the shock could be used on a vehicle such that in a turn, some dampers would be softened while others were stiffened to reduce body roll. For example, in a turn the outboard shocks would be stiffened for compression while the inboard shocks would be softened for compression.

More specifically, in a turn, the outboard shock would receive no current to the multi-stage active valve (maintaining compression stiffness) while the inboard shock would receive full current to the multi-stage active valve (reducing compression stiffness).

For example, in whoops the multi-stage active valve would be opened to soften the suspension. In a washboard situation, the dampers could be stiffened or softened depending upon performance requirements, user preference, etc. In a full extension scenario (e.g., jumping the vehicle) the dampers would harden the suspension for landing.

In one embodiment, the electronic valves are in a system with a controller to adjust between softer, firmer, etc., used for body roll, body motion, etc. In one embodiment, the full current is 0.88 amps which opens the multi-stage active valve to soften the damping. In a normally firm suspension setting, to make a valve soft (e.g., an open setting), full current would be applied.

In one embodiment, when the first stage valve is energized, it will drop pressure behind the second stage valve. The drop in pressure behind the second stage valve will allow fluid to bypass the main piston which will result in a softer damping setting and a smoother ride which will be valuable when traversing a bump, bumpy terrain, etc.

In one embodiment, to reduce body roll, the first stage valve will not be energized thereby maintaining the pressure behind the second stage valve. The pressure behind the second stage will not allow fluid to bypass the main piston which will result in a firm damping setting which will reduce body roll since most or all of the fluid in the damper will have to pass through the main piston valve.

In the following discussion, the term "active", as used when referring to a valve or damping component, means adjustable, manipulatable, etc., during typical operation of the valve. For example, an active valve can have its operation changed to thereby alter a corresponding damping characteristic from a "soft" damping setting to a "firm" damping setting by, for example, adjusting a switch in a passenger compartment of a vehicle. Additionally, it will be understood that in some embodiments, an active valve may also be configured to automatically adjust its operation, and corresponding damping characteristics, based upon, for example, operational information pertaining to the vehicle and/or the suspension with which the valve is used. Similarly, it will be understood that in some embodiments, an active valve may be configured to automatically adjust its operation, and corresponding damping characteristics, to provide damping based upon received user input settings (e.g., a user-selected "comfort" setting, a user-selected "sport" setting, and the like). Additionally, in many instances, an "active" valve is adjusted or manipulated electronically (e.g., using a powered solenoid, or the like) to alter the operation or characteristics of a valve and/or other component. As a result, in the field of suspension components and valves, the terms "active", "electronic", "electronically controlled", and the like, are often used interchangeably.

In the following discussion, the term "manual" as used when referring to a valve or damping component means manually adjustable, physically manipulatable, etc., without requiring disassembly of the valve, damping component, or suspension damper which includes the valve or damping component. In some instances, the manual adjustment or physical manipulation of the valve, damping component, or suspension damper, which includes the valve or damping component, occurs when the valve is in use. For example, a manual valve may be adjusted to change its operation to alter a corresponding damping characteristic from a "soft" damping setting to a "firm" damping setting by, for example, manually rotating a knob, pushing or pulling a lever, physically manipulating an air pressure control feature, manually operating a cable assembly, physically engaging a hydraulic unit, and the like. For purposes of the present discussion, such instances of manual adjustment/physical manipulation of the valve or component can occur before, during, and/or after "typical operation of the vehicle".

It should further be understood that a vehicle suspension may also be referred to using one or more of the terms "passive", "active", "semi-active" or "adaptive". As is typically used in the suspension art, the term "active suspension" refers to a vehicle suspension which controls the vertical movement of the wheels relative to vehicle. Moreover, "active suspensions" are conventionally defined as either a "pure active suspension" or a "semi-active suspension" (a "semi-active suspension" is also sometimes referred to as an "adaptive suspension"). In a conventional "pure active suspension", a motive source such as, for example, an actuator, is used to move (e.g. raise or lower) a wheel with respect to the vehicle. In a "semi-active suspension", no motive force/actuator is employed to adjust move (e.g. raise or lower) a wheel with respect to the vehicle. Rather, in a "semi-active suspension", the characteristics of the suspension (e.g. the firmness of the suspension) are altered during typical use to accommodate conditions of the terrain and/or the vehicle. Additionally, the term "passive suspension", refers to a vehicle suspension in which the characteristics of the suspension are not changeable during typical use, and no motive force/actuator is employed to adjust move (e.g. raise or lower) a wheel with respect to the vehicle. As such, it will be understood that an "active valve", as defined above, is well suited for use in a "pure active suspension" or a "semi-active suspension".

A modular active valve system is disclosed. The system includes at least one damping assembly to connectively couple a vehicle suspension with at least one wheel, the at least one damping assembly having a shaft with an internal diameter of ⅞ inch or less. At least one modular active valve system incorporated within the at least one damping assembly, the at least one modular active valve system having an external diameter that is less than the internal diameter of the at least one damping assembly. An active valve control for actively adjusting the at least one modular active valve to modify a performance characteristic of the at least one damping assembly.

Operation

Figure 1A:
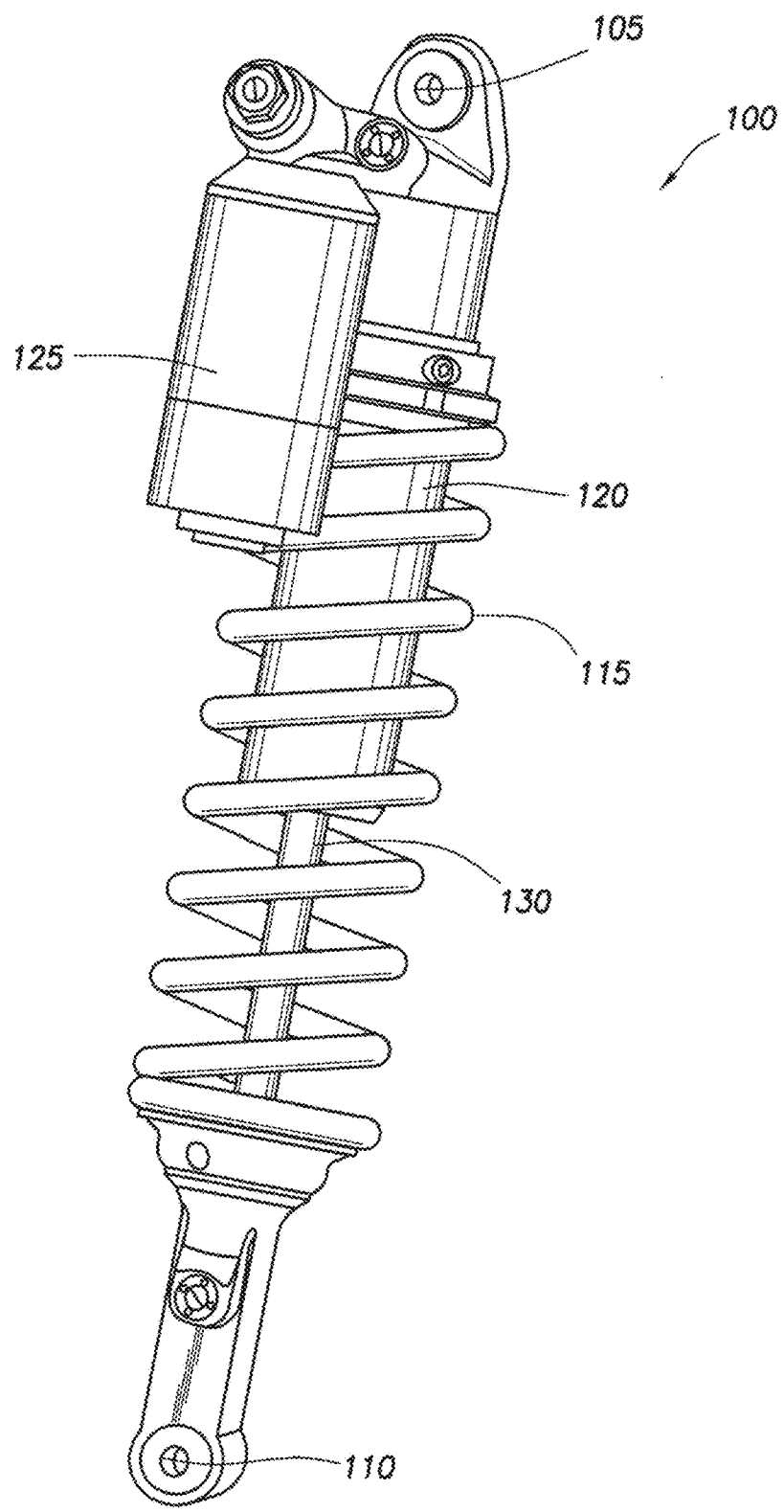
FIG. 1A is a perspective view of a damping assembly, in accordance with an embodiment.

FIG. 1A is a perspective view of a damping assembly 100 in accordance with an embodiment. In one embodiment, the damping assembly 100 is a smaller platform damping assembly for use in a smaller sized vehicle with a semi-active damping assembly, a vehicle such as a motorcycle, an ATV, a snowmobile, a water vehicle, and the like.

Figure 1B:
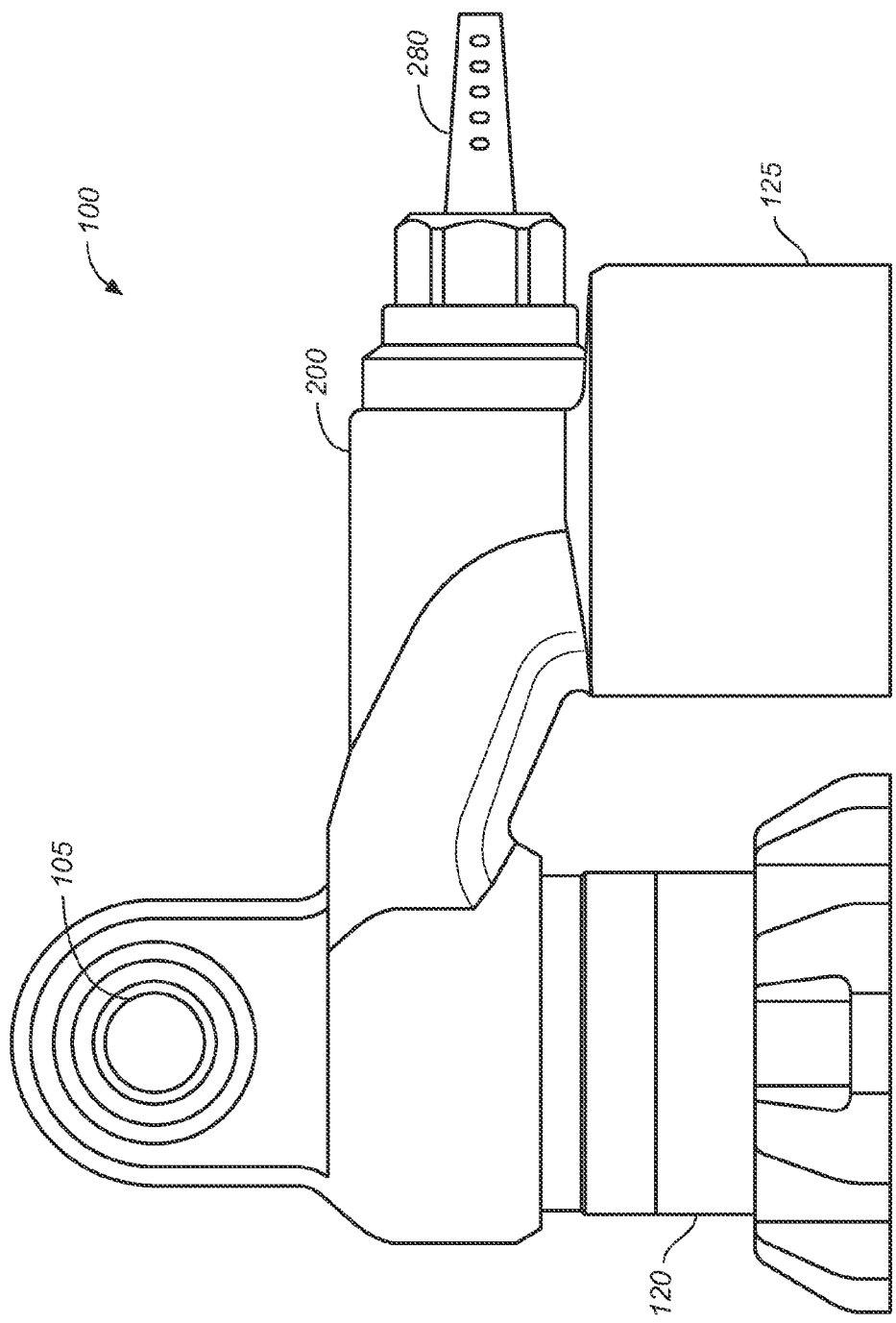
FIG. 1B is a side view of a section of the damping assembly with a modular active base valve, in accordance with an embodiment.

In one embodiment, the damping assembly 100 includes eyelets 105 and 110, a helical spring 115, a damper housing 120 with a piston and chamber, a piston shaft 130, and an external fluid reservoir 125. In one embodiment, external fluid reservoir 125 has a floating piston and pressurized gas to compensate for a reduction in volume in the main damper chamber of the damping assembly 100 as the piston shaft 130 moves into the damper body. Fluid communication between the main chamber of the damper and the external fluid reservoir 125 may be via a flow channel including a base valve (as shown in FIG. 1B). In its basic form, damping assembly 100 works in conjunction with the helical spring and controls the speed of movement of the piston shaft by metering incompressible fluid from one side of the damper piston to the other, and additionally from the main chamber to the reservoir, during a compression stroke (and in reverse during the rebound or extension stroke).

Although a number of features are shown on damping assembly 100, it should be appreciated that the damping assembly could be of different configurations such as having one or fewer components such as no helical spring 115, no external fluid reservoir 125, or the like. An example of a different damping assembly configuration is shown in FIG. 11. Further, damping assembly 100 could have one or more additional features, in place of (or in addition to) the features shown in FIG. 1A.

FIG. 1B is a side view of a section of the damping assembly 100 with a base valve 200 shown in accordance with an embodiment. As described in FIG. 1A, in one embodiment, damping assembly 100 includes eyelet 105, damper housing 120, external fluid reservoir 125, base valve 200, and a strain relief 280 for the control wire to base valve 200. In one embodiment, the length of strain relief 280 is different depending upon space, footprint, or other manufacturing or use reasons. In one embodiment, there may be no strain relief 280 at all.

Figure 2:
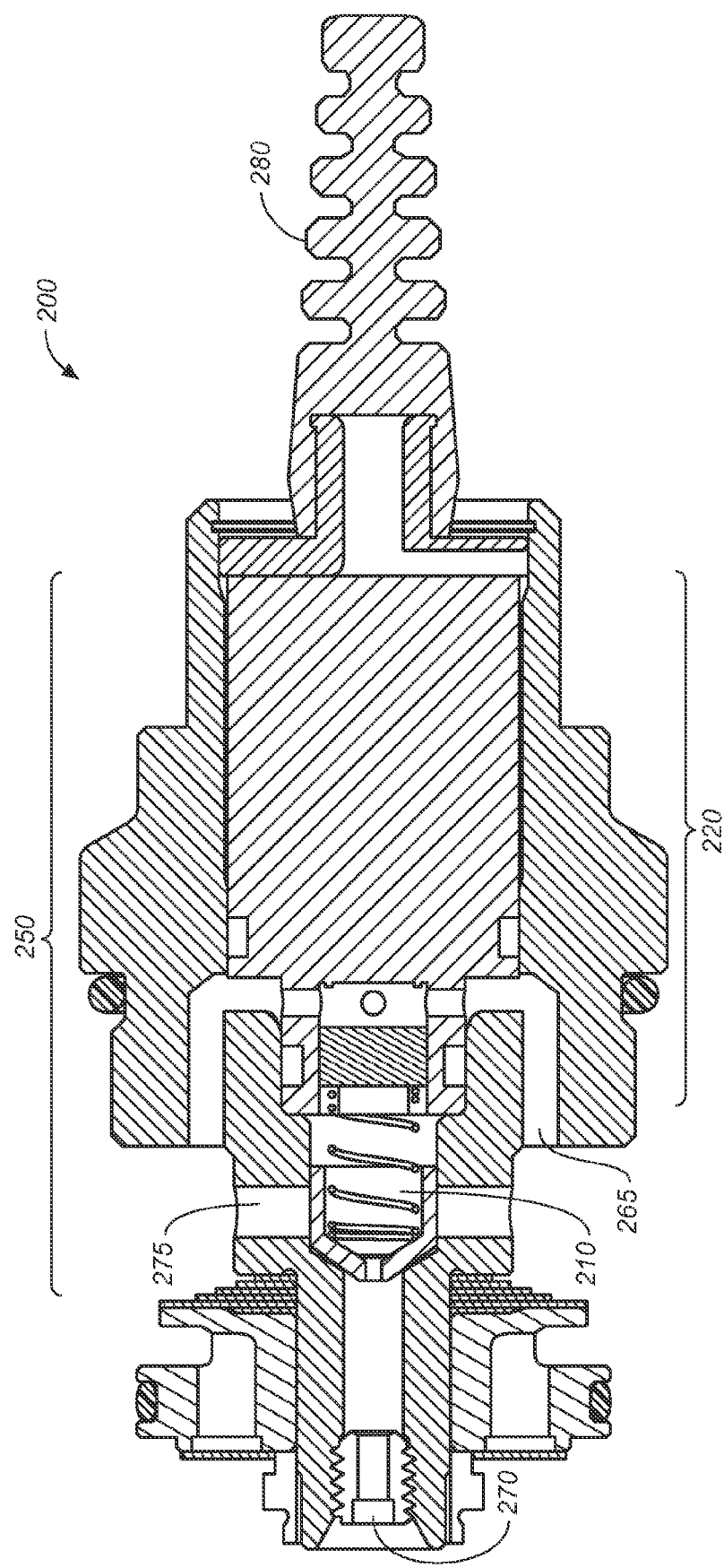
FIG. 2 is a side section view of a modular active valve system in a base valve configuration, in accordance with an embodiment.

FIG. 2 is an embodiment of a side section view of a modular active valve system 250 in a base valve 200 configuration. In one embodiment, the modular active valve system 250 is a compact design (e.g., fits many/most/all shock architectures) and electronic control of bleed (e.g., a larger flow capability). For example, the modular active valve system 250 can be used as a base valve 200, as a main piston valve, or the like. Because of the reduced size of the modular active valve system 250, it can be used in a smaller platform damper. In one embodiment, modular active valve system 250 includes a first stage and a second stage. In one embodiment, modular active valve system 250 includes a first stage, a second stage, and a third stage.

In one embodiment, the modular active valve system 250 in the base valve 200 configuration includes a (first stage) active pilot valve 220 (e.g., a solenoid valve or the like) which could be a modal valve on/off, a proportional valve, or the like. Base valve 200 also includes a port 265, an upstream restriction 270 (to control the max flow), a main relief valve 210 with orifice 275, and a strain relief 280.

In one embodiment, base valve 200 could be a modal (2-position) base valve with little to no dead length added. In so doing, the base valve system has a large range in compression damping, similar to a conventional active valve system. In one embodiment, the active pilot valve 220 could be operated with a simple control system for a modal setting with a 2-position valve or a more advanced control system if utilizing a proportional valve for semi-active control. This can also be combined with a boost cylinder upstream of the active pilot valve 220 if desired.

In one embodiment, the modular active valve system 250 that is within the base valve 200 will have a high range of compression adjustability (e.g., up to lockout). Moreover, because of the low dead length of the modular active valve system 250, it would fill almost all applications since the dead length is similar to the length of the knob. Moreover, the modular active valve system 250 has a large flow capability and can be combined with the boosted main piston valve 300 to provide further damping control and adjustment capabilities to the damping assembly 100.

In a single stage valve, in order to provide an appropriate range of damping control, a larger coil is used in conjunction with a larger armature and a larger port size (e.g., diameter P). However, the use of the larger coil, larger port, and larger armature results in a valve footprint of a first size (f) thereby causing a first dead space length (ds). As such, there is a certain port diameter (P1) and component size that is necessary for a desired damping control range, any reduction in port diameter (P1Δd) and component size will reduce the damping control range of the valve.

In contrast, in modular active valve system 250 (e.g., a multi-stage valve), the active pilot valve 220 is used to control the pressure that acts on the main stage (e.g., the main relief valve 210 of FIG. 2 or boost cylinder 325 of FIG. 3). Since the active pilot valve 220 is only controlling pressure on the main stage, the flow rate (and therefore the port 265 diameter P2) can be much smaller than a comparable single stage valve P1 providing the same damping control range. In other words, the small amount of flow through port 265 is used to regulate the pressure applied to the main valve (e.g., the boost cylinder 325 or the main relief valve 210) which is used to control the flow through the larger main valve pathways, where the damping is controlled.

In one embodiment, the multi-stage valves of modular active valve system 250 will be able to use a smaller coil, smaller port, and smaller armature to obtain a similar (or an even larger) damping range than a single stage valve. Thus, the multi-stage valves of modular active valve system 250 (with a similar damping range to a single stage valve) will have a footprint (f2) that is smaller than the footprint f of the single stage valve and similarly a dead space length (ds2) that is smaller than the ds of the single stage.

Because of the smaller size of the multi-stage active valve, it can be used in place of a single stage valve in applications that require a smaller footprint while maintaining a similar damping control range.

In one embodiment, the multi-stage valves of modular active valve system 250 is modular such that it can be used with preexisting components of a similar sized damper. In one embodiment, the only modification to the damper would be the replacement of an existing base valve with the modular active valve system 250, the addition of the valves of modular active valve system and a new shaft to work as an active main piston, or a combination thereof. In one embodiment, the rest of the shock body remains modular.

In one embodiment, multi-stage active valve is used in a modal situation (e.g., a straight current sent to valves), or in a semi-active situation, e.g., various sensor input that is provided to an electronic control unit (ECU). The multi-stage active valve could be solenoid controlled such as an on/off solenoid. In one embodiment, the active valve is solenoid controlled with an infinitely adjustable range.

In general operation, active pilot valve 220, when open, permits a first flow rate of the working fluid through one or more orifices of damping assembly 100. In contrast, when active pilot valve 220 is partially closed, a second flow rate of the working fluid though one or more orifices occurs. The second flow rate is less than the first flow rate but greater than no flow rate. When active pilot valve 220 is completely closed, the flow rate of the working fluid though the one or more orifices is statistically zero.

In one embodiment, instead of (or in addition to) restricting the flow through an orifice in the damper, active pilot valve 220 can vary a flow rate through an inlet or outlet passage within the active pilot valve 220, itself. See, as an example, the electronic valve of FIGS. 2-4 of U.S. Pat. No. 9,353,818 which is incorporated by reference herein, in its entirety, as further example of different types of "electronic" or "active" valves). Thus, the active pilot valve 220, can be used to meter the working fluid flow (e.g., control the rate of working fluid flow) with/or without adjusting the flow rate through one or more orifices.

In one embodiment, by utilizing an active pilot valve 220, a relatively small solenoid (using relatively low amounts of power) can generate relatively large damping forces. Furthermore, due to incompressible fluid inside the damping assembly 100, the result is a controllable damping rate. Certain active valve features are described and shown in U.S. Pat. Nos. 9,120,362; 8,627,932; 8,857,580; 9,033,122; and 9,239,090 which are incorporated herein, in their entirety, by reference.

In one embodiment, active pilot valve 220 is solenoid operated, hydraulically operated, pneumatically operated, or operated by any other suitable motive mechanism (such as a poppet valve, spool valve, and the like). Active pilot valve 220 may be operated remotely by a switch or potentiometer located on the vehicle (or in one embodiment, in the cockpit of a vehicle) or attached to appropriate operational parts of a vehicle for timely activation (e.g. brake lever/pedal) or may be operated in response to input from a microprocessor (e.g. calculating desired settings based on vehicle acceleration sensor data, pitch data, yaw data, terrain data, imagery, or the like) or any suitable combination of activation means. In like manner, a controller for active pilot valve 220 may be manually adjustable, microprocessor controlled, or the like. The operation of active pilot valve 220 is described in further detail in FIGS. 15-17.

Referring still to FIG. 2, the modular active valve system 250 in the base valve 200 configuration also includes a (second stage) main relief valve 210 used to control the timing and quantity of fluid flow through the flow path. In one embodiment, the main relief valve 210 includes a hole, usually round or oval, a tapered plug, and a spring. The main relief valve 210 is sprung based on a pre-defined blow off pressure. In operation, when compression pressure reaches the blow-off level the plug of the main relief valve 210 is lifted off its seat and allows fluid to flow therethrough. After the fluid pressure is reduced to below the blow-off level, spring and fluid pressure force the plug up again, closing the main relief valve 210.

In one embodiment, main relief valve 210 is a pressure relief or blow-off valve, e.g., a high-speed compression circuit that operates at a blow-off threshold, typically due to a relatively rapid event like the rapid compression of the damping assembly 100. In main relief valve 210 the blow-off pressure is determined by a combination of the spring rate of the spring, the preload on the spring and the area of main relief valve 210 that is subject to fluid pressure. When the fluid pressure rises above the predetermined (e.g. preset) threshold, the plug is forced away from the piston seat and allows fluid to flow through the valve opening. In one embodiment, main relief valve 210 is a safety device and is typically set to crack or "blow-off", thereby allowing fluid flow into the compression portion of the damping chamber, at a pressure that is relatively high but still low enough to prevent excess pressure build up from damaging the damping assembly 100 or the vehicle in which the damper is integrated.

In general, main relief valve 210 and active pilot valve 220 operate independently of each other. Thus, even when active pilot valve 220 is completely closed with no fluid entering the compression portion of the chamber through the active pilot valve 220, the damping rate will decrease to some extent when a threshold pressure of main relief valve 210 is reached, thereby opening main relief valve 210 and allowing fluid to flow to the compression portion of the damping assembly 100 via a different flow path independent of the orifice(s) managed by active pilot valve 220.

In one embodiment, as shown in FIG. 11 and described further herein, the modular active valve system 250 in the base valve 200 could also include an optional (third stage), e.g., a boost cylinder 325 similar to the boost cylinder 325 as shown in the boosted main piston of FIG. 3. In one embodiment, the boost cylinder 325 is added upstream of the main relief valve, similar to the boosted main piston design. In one embodiment, if the boost cylinder 325 is added to the modular active valve system 250, the (3-stage) electronic base valve will be able to be preloaded.

FIG. 3 is a side section view of a modular active valve system 250 having an active pilot valve 220 and a boosted main cylinder 325 in a main piston valve 300 configuration of a damping assembly 100 shown in accordance with an embodiment. In one embodiment, the modal boost cylinder configuration shown in FIG. 3 includes an upstream flow reducer 302 for tuning upstream pressure drop. In addition, in one embodiment, there is a post/top out 304 that is indexed with the boost cylinder 325 to prevent rotation. The shaft 310 is also shown, and in one embodiment, the shaft 310 diameter is less than or equal to ⅞ inch. Active pilot valve 220 is similar to that discussed in FIG. 2 and, as such, the description and operation of active pilot valve 220 is not repeated for purposes of clarity.

In one embodiment, the active pilot valve 220 uses a small low flow valve. By using the small low flow valve, manufacturing costs can be lowered. In addition, the smaller footprint allows the active pilot valve 220 to fit within a smaller shaft and provide a reduce dead length. In other words, the travel length of the damper piston within the main damper chamber is limited by the length of the valve—e.g., dead space. Thus, by using the multi-stage valve, the length of the dead space is the length of the smaller multi-stage valve design (versus the dead space length of a longer valve design). Further, in one embodiment, the small low flow valve will have smaller coils which will provide a faster response time (e.g., approximately 10 ms).

In one embodiment, the boost cylinder 325 is a modal (2-position) system with little dead length added. The system has a large range in compression damping with an optional rebound bleed modal setting. This provides a low cost option with a fast response time. In one embodiment, the boost cylinder 325 is operated with a simple control system for a modal setting with a 2-position valve, or a more advanced control system if utilizing a proportional valve for semi-active control. In one embodiment, the configuration is for compression control. In another embodiment, the configuration could be reversed for rebound control.

In one embodiment, the main relief valve 210 (of FIG. 2) could be used in place of the boost cylinder 325 making the main piston a two-stage bleed design main piston.

In one embodiment, adding modular active base valve 200 to the boosted main piston valve 300 results in a 3-stage modular active valve 250 as shown in FIG. 11. Referring to FIG. 11, a side section view 1100 of an embodiment of a modular active valve system having a configuration similar to base valve 200 (e.g., an active pilot valve 220 and a main relief valve 210), and a boost cylinder 325 operating independently of each other in a main piston valve 300 configuration of a damper assembly. In one embodiment, the modal boost cylinder configuration shown in FIG. 11 includes an upstream flow reducer 302 for tuning upstream pressure drop. In addition, in one embodiment, there is a post/top out 304 that is indexed with the boost cylinder 325 to prevent rotation. The shaft 310 is also shown, and in one embodiment, the shaft 310 diameter is less than or equal to ⅞ inch. The components and operation of FIG. 11 are similar to that discussed in FIGS. 2 and 3 and, as such, the description and operation is not repeated for purposes of clarity.

Referring again to FIG. 3, in one embodiment, if the boost cylinder 325 is configured for rebound control, the boost cylinder 325 could be used in conjunction with the 2 (or 3)-stage active base valve 200 which would provide the damping assembly 100 with two active valves. In one embodiment, one of the two active valves would be used for rebound control and the other could be used for compression control. In one embodiment, both of the two active valves would be used for rebound control. In one embodiment, both of the two active valves would be used for compression control.

In one embodiment, the boost cylinder 325 has two compression settings that includes a high range of compression adjustability (up to lockout). In one embodiment, the boost cylinder 325 has two rebound bleed settings that has a similar range as seen from 0-24 clicks in current shocks. In one embodiment, the boosted main system has a low dead length (e.g., approximately 0.5 in), and the valve can fit in reduced shaft sizes such as, for example, it can fit within a ⅞" shaft.

Figure 4A:
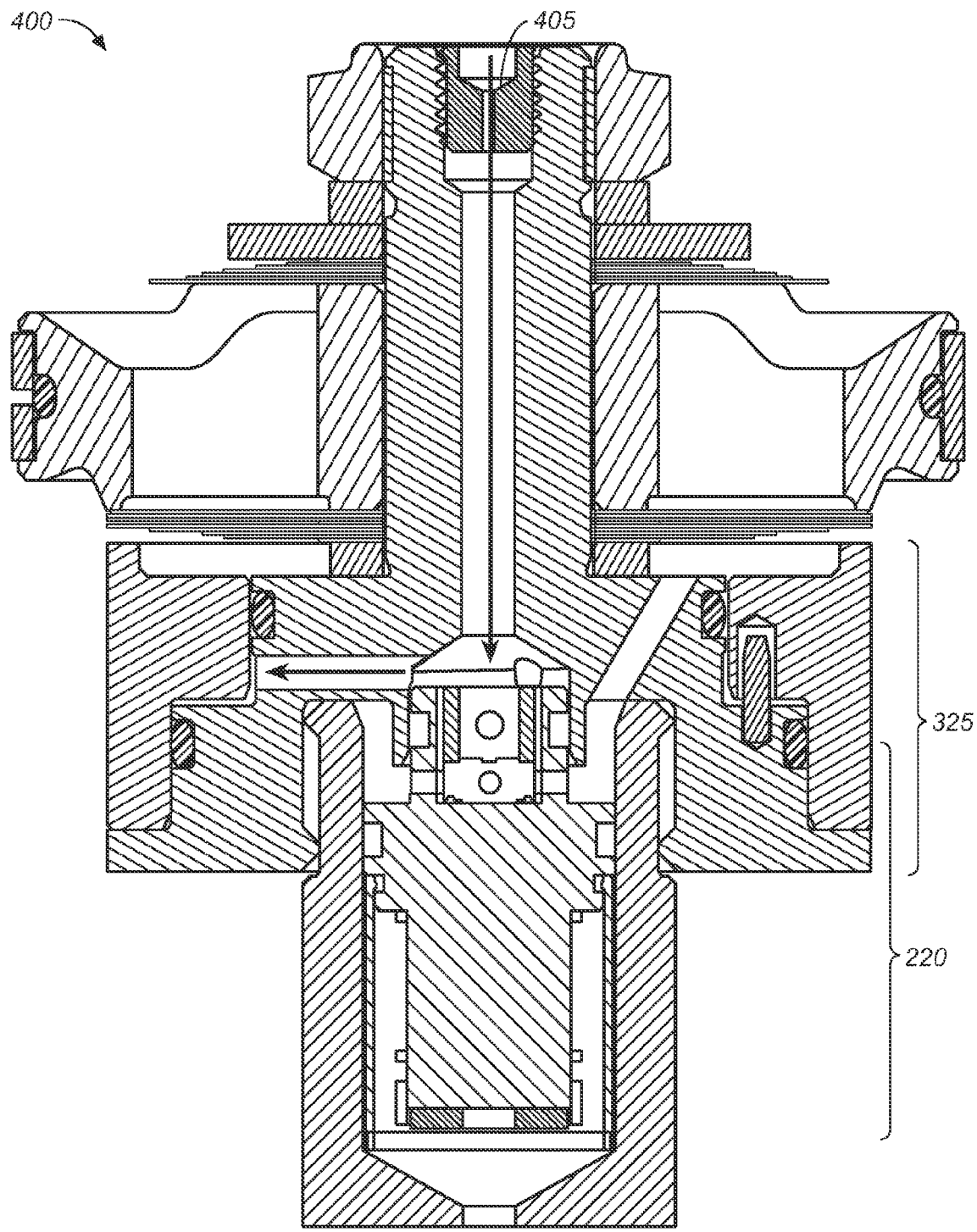
FIG. 4A is a side section view of the closed flow path through the main piston valve, during compression, in accordance with an embodiment.
Figure 4B:
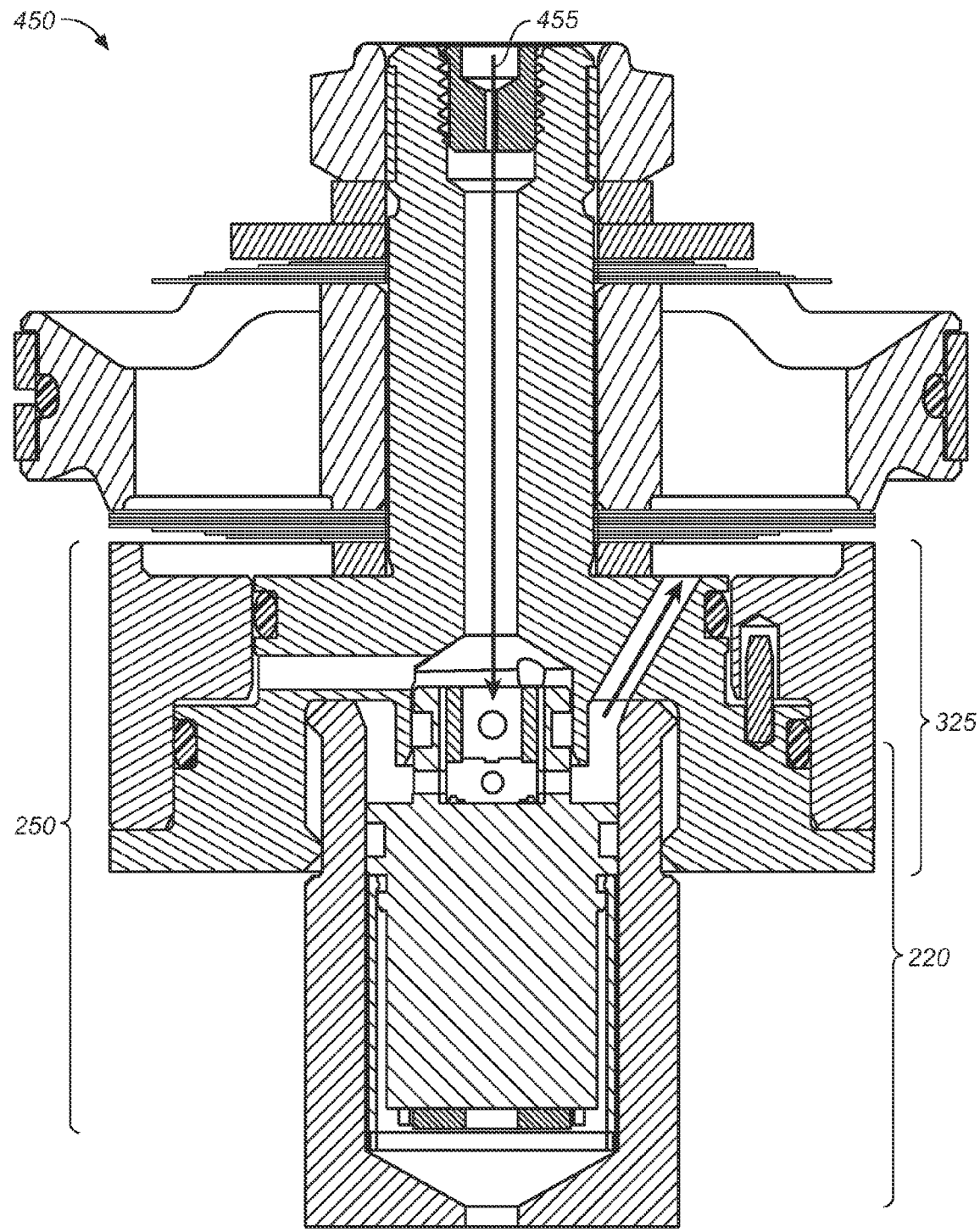
FIG. 4B, is a side section view of the open flow path through the main piston valve, during compression, in accordance with an embodiment.

With reference now to FIG. 4A, the closed flow path configuration 400 through the main piston valve 300, during compression, is shown in accordance with an embodiment. With reference also to FIG. 4B, the open flow path configuration 450 through the main piston valve 300, during compression, is shown in accordance with an embodiment.

Referring to FIG. 4A, when the main piston valve 300 is in the closed flow path configuration 400, the flow is shown by flow path 405. In one embodiment, the closed flow path configuration 400 causes fluid to move through upstream restriction, post, and into the boost cylinder 325. In one embodiment, the closed flow will have a high boost ratio to ensure shims are clamped for a modal setting. In one embodiment, the damping range can be adjusted through the boost cylinder 325 design, e.g., to block flow ports, change a bending mode of shims, or the like.

However, as shown in FIG. 4B, when the main piston valve 300 is in the open flow path configuration 450, the flow is shown by flow path 455. In one embodiment, flow path 455 goes through the upstream restriction, the post, the valve, and out to the rebound side.

Figure 5A:
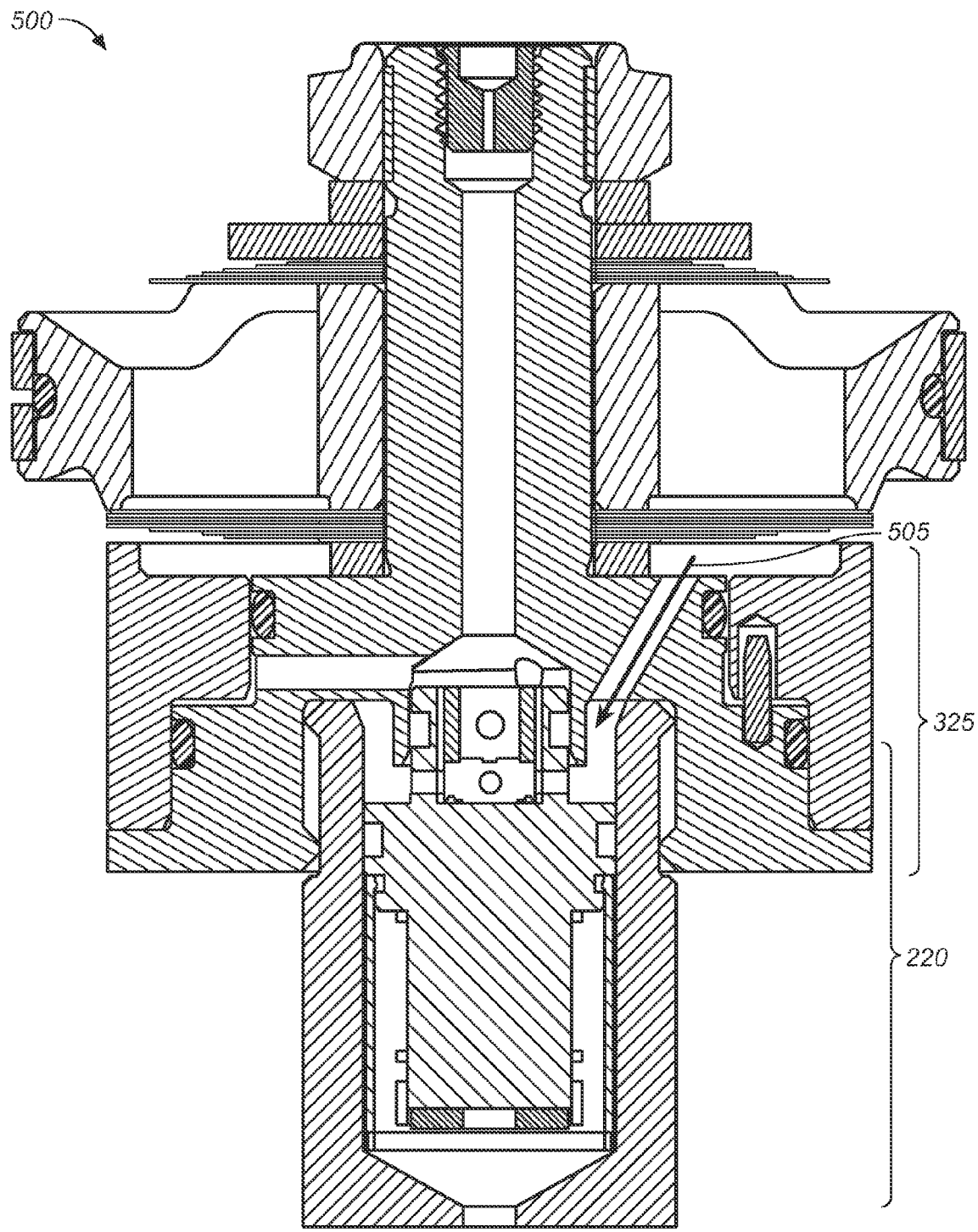
FIG. 5A is a side section view of the closed flow path through the main piston valve, during rebound, in accordance with an embodiment.
Figure 5B:
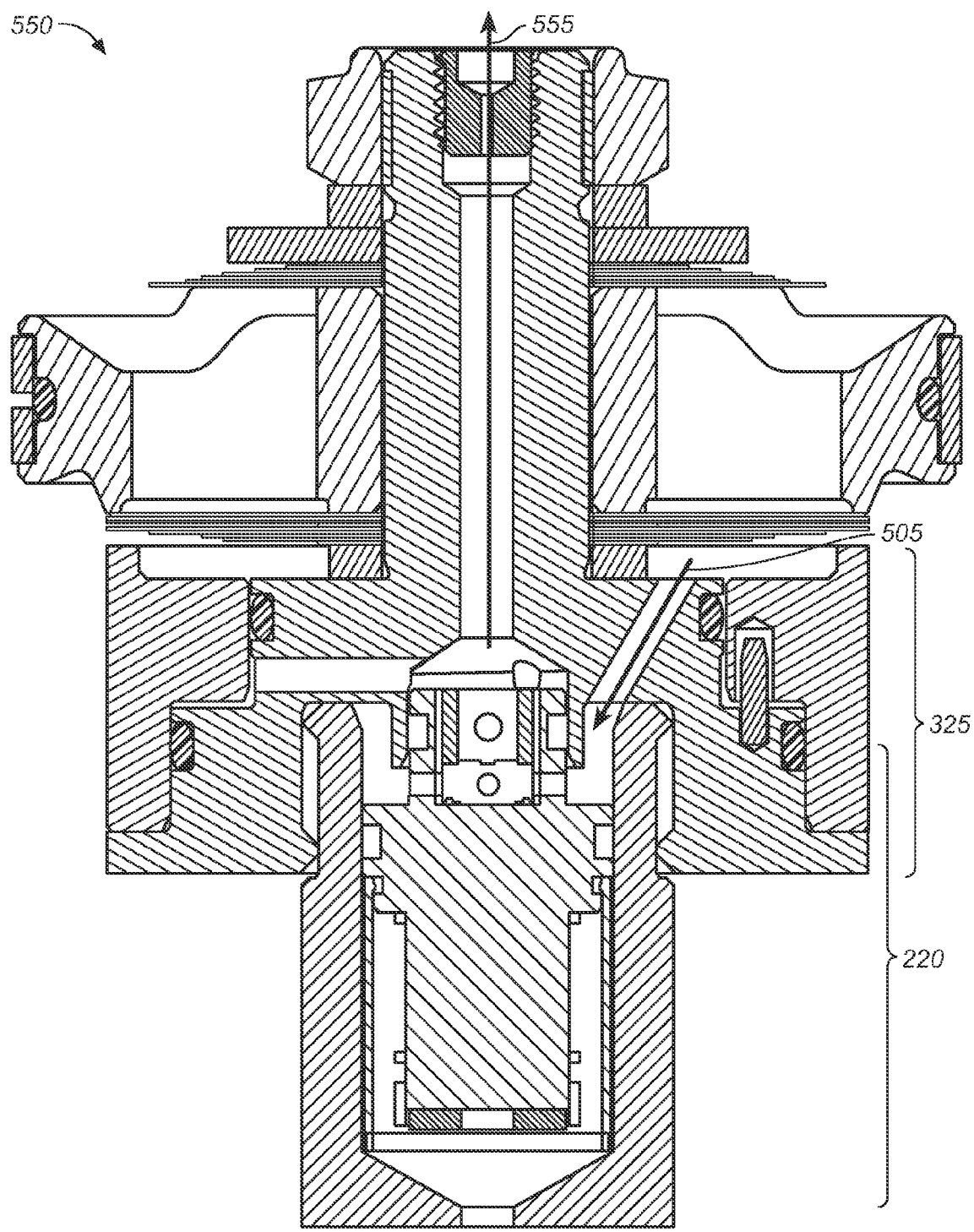
FIG. 5B, is a side section view of the open flow path through the main piston valve, during rebound, in accordance with an embodiment.
Figure 18:
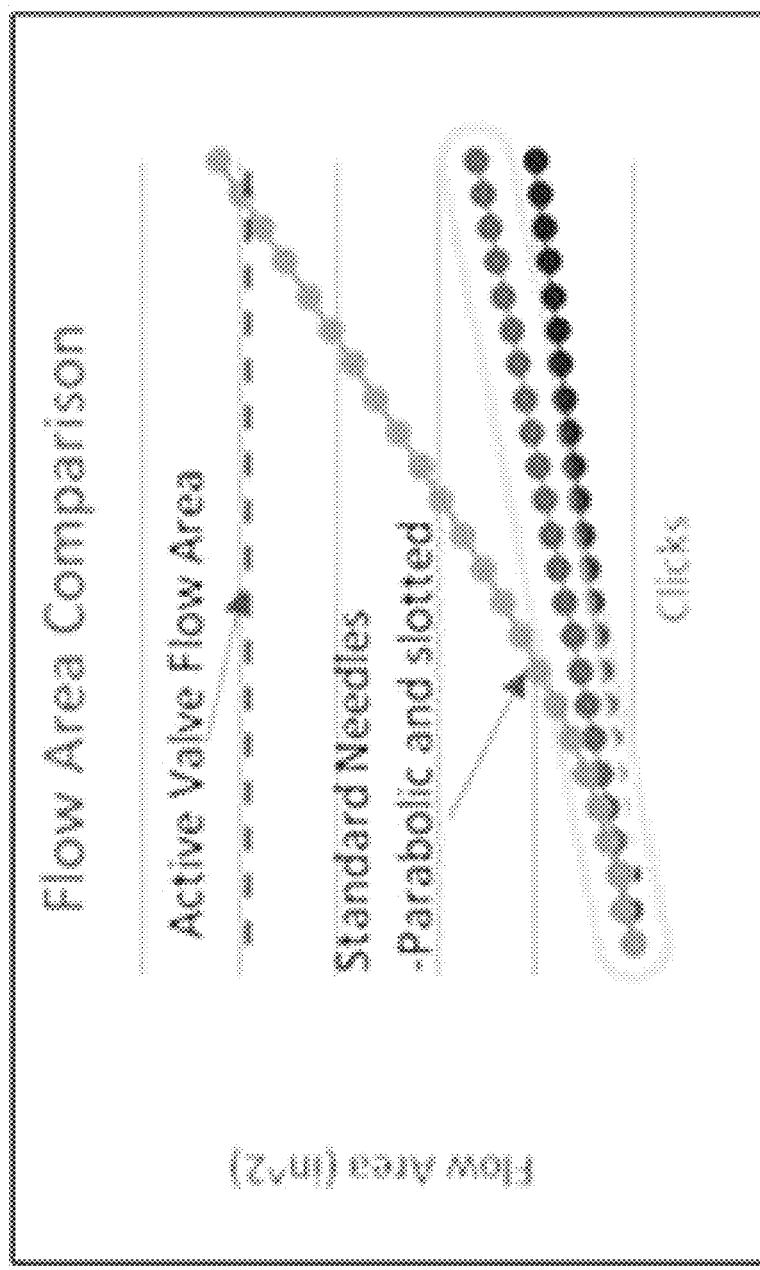
FIG. 18 is a duplicate of the graph (originally found between paragraph [0077] and paragraph [0078] of Applicant's Specification as filed) in its entirety and without any modifications or any new matter, per the notice to file corrected application papers, in accordance with an embodiment.

With reference now to FIG. 5A, the closed flow path configuration 500 through the main piston valve 300, during rebound, is shown in accordance with an embodiment. With reference also to FIG. 5B, the open flow path configuration 550 through the main piston valve 300, during rebound, is shown in accordance with an embodiment. As shown in the graph duplicated in FIG. 18 in its entirety without any modification or any new matter, per a notice to file corrected application papers, using the active main piston valve, the flow area is approximately the same as a 0-24 click rebound adjustment range (see FIG. 18).

Referring to FIG. 5A, when the main piston valve 300 is in the closed flow path configuration 500, the flow is shown by flow path 505. In one embodiment, the closed flow path configuration 500 causes fluid flow to be blocked by active pilot valve 220.

In contrast, as shown in FIG. 5B, when the main piston valve 300 is in the open flow path configuration 550, the flow is shown by flow path 555. In one embodiment, flow path 555 enables the flow to move through active pilot valve 220.

Figure 6:
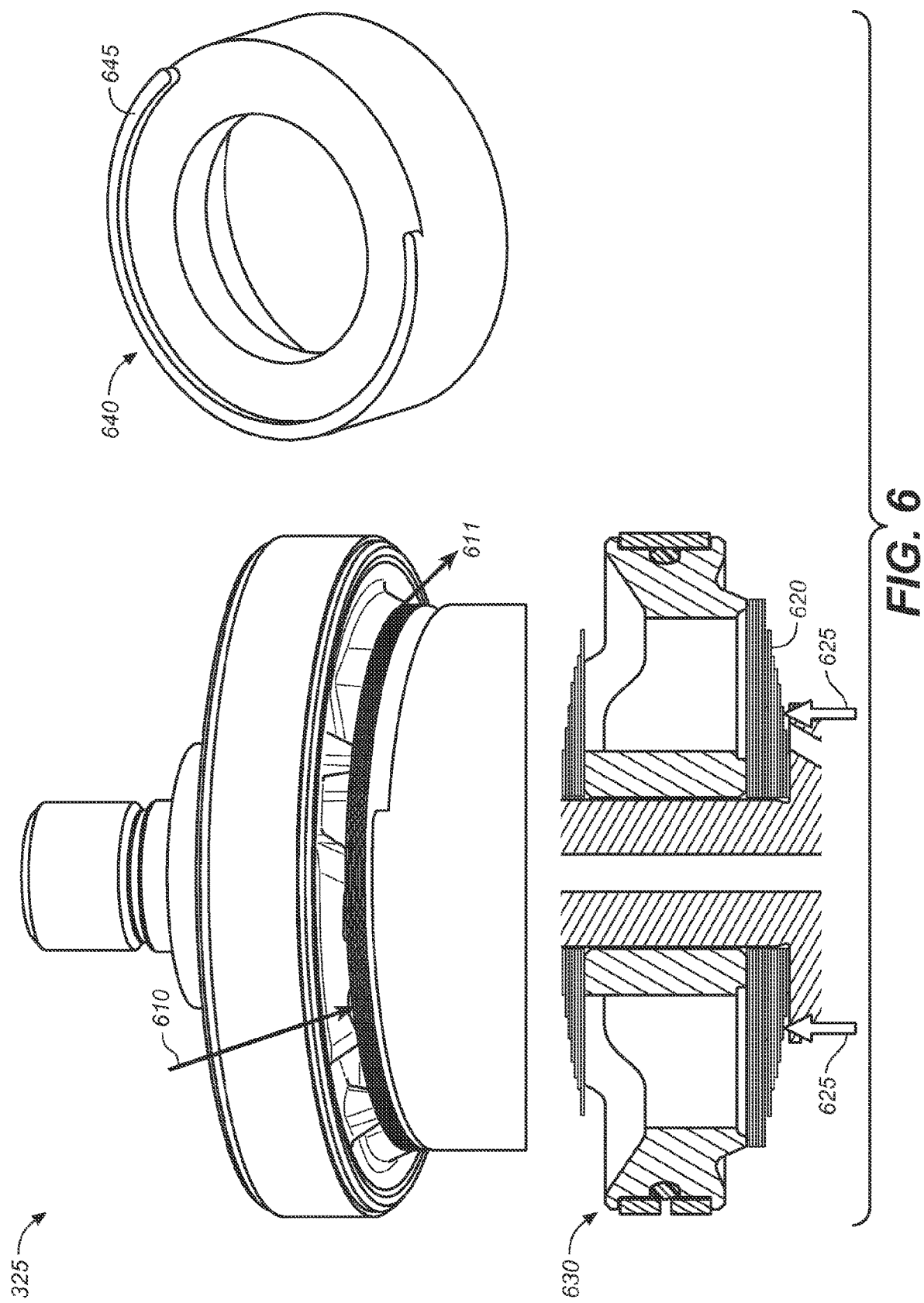
FIG. 6 is an exploded view of a non-symmetric boost cylinder, in accordance with an embodiment.

FIG. 6 is an exploded view of a non-symmetric configuration of a boost cylinder 325 in accordance with an embodiment. In one embodiment, the boost cylinder 325 can be designed to clamp specific portions of the shim stack 620 to allow for a blow off if the boost cylinder 325 were to lock. In one embodiment, the different boost cylinder designs that clamp to different portions of the valve stack can significantly change the damping characteristics.

For example, as shown in FIG. 6, a high boost ratio is used to ensure clamp 640 clamps the shim stack 620 when the valve is open, and the damping range can be adjusted by having a non-symmetric boost cylinder 325. For example, clamp 640 includes a clamp area 645 with a partial opening therein. In so doing, the clamp area 645 with a partial opening will close off three ports (e.g., ports 610) on the piston but allow one open port (e.g., port 611) which allows for a safety blow off if the boost cylinder 325 is seized. In another embodiment, the clamp area 645 with a partial opening can close off two ports, one port, or the like. In another embodiment, the partial opening in the clamp area 645 is factory set.

In one embodiment, the boost cylinder 325 having a clamp area 645 with a partial opening will also include an indexing post or clocking pin (e.g., pin/post 305 of FIG. 3) to keep the opening in the clamp area 645 properly aligned with the port(s) 610 and 611 such that the anti-seize performance of boost cylinder 325 is not compromised by unwanted rotation of the clamp.

In one embodiment, as shown in 630 of FIG. 6, the damping range of the boost cylinder 325 can be adjusted by modifying which shim 625 in the shim stack 620 is being contacted by the clamp 640. For example, if the clamp 640 presses on the smallest shim in the stack (the pivot shim), the damping will be at a first value. However, if the clamp 640 presses on a larger diameter valve shim, it will effectively cause the larger diameter shim to become the "pivot shim", causing the boost cylinder 325 to be much more rigid. Thus, depending upon which shim 625 in the shim stack 620 is in contact with clamp 640, the damping characteristics of boost cylinder 325 can be modified.

Figure 7:
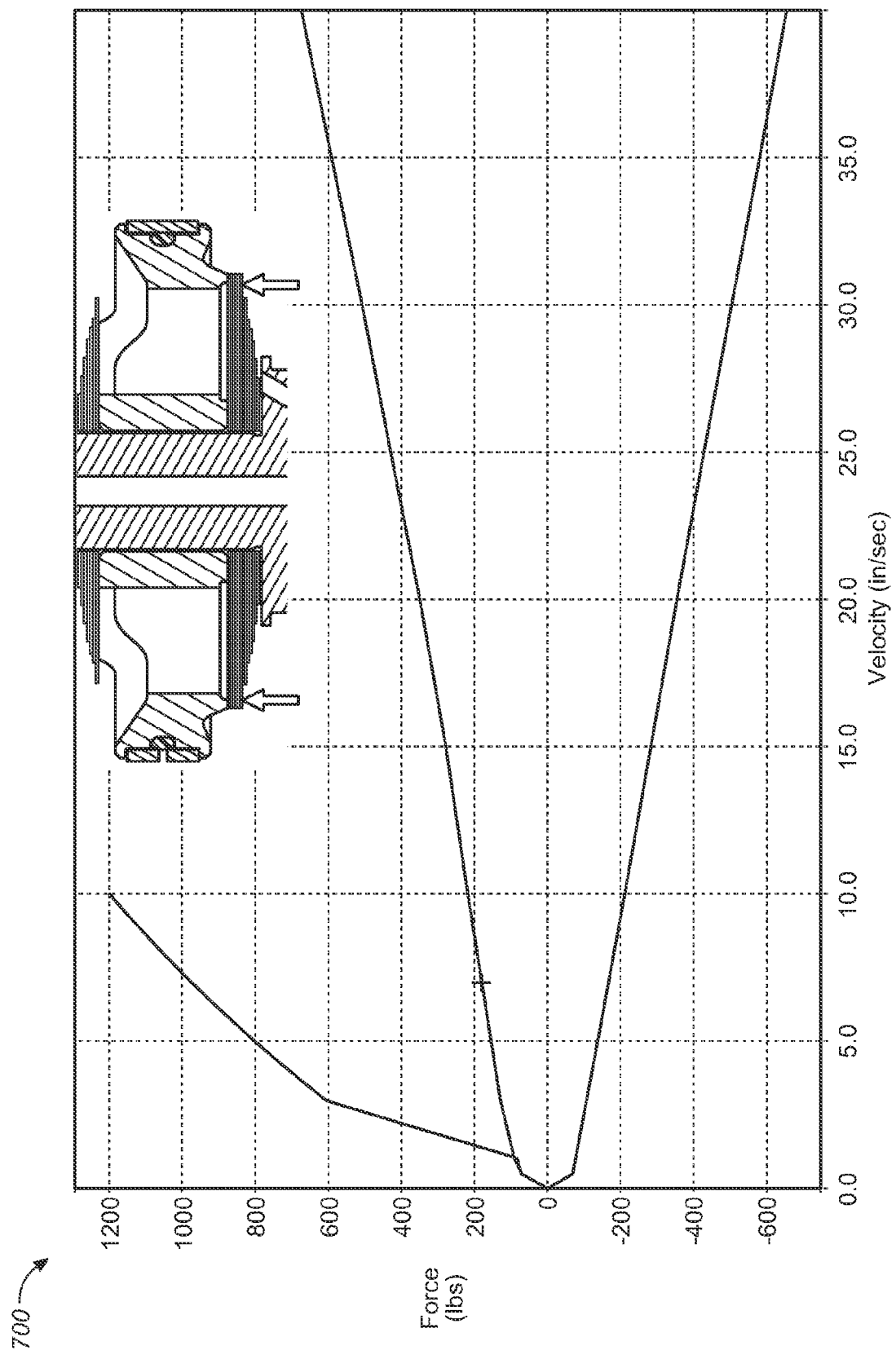
FIG. 7 is a graph of the force in pounds versus the velocity in inches-per-second, when the clamp presses on a larger diameter valve shim, effectively causing the larger diameter shim to become the "pivot shim", in accordance with an embodiment.

FIG. 7 is a graph 700 of the force in pounds versus the velocity in inches-per-second, when clamp 640 presses on a larger diameter valve shim, effectively causing the larger diameter shim to become the "pivot shim", causing the boost cylinder 325 to have a first characteristic.

Figure 8:
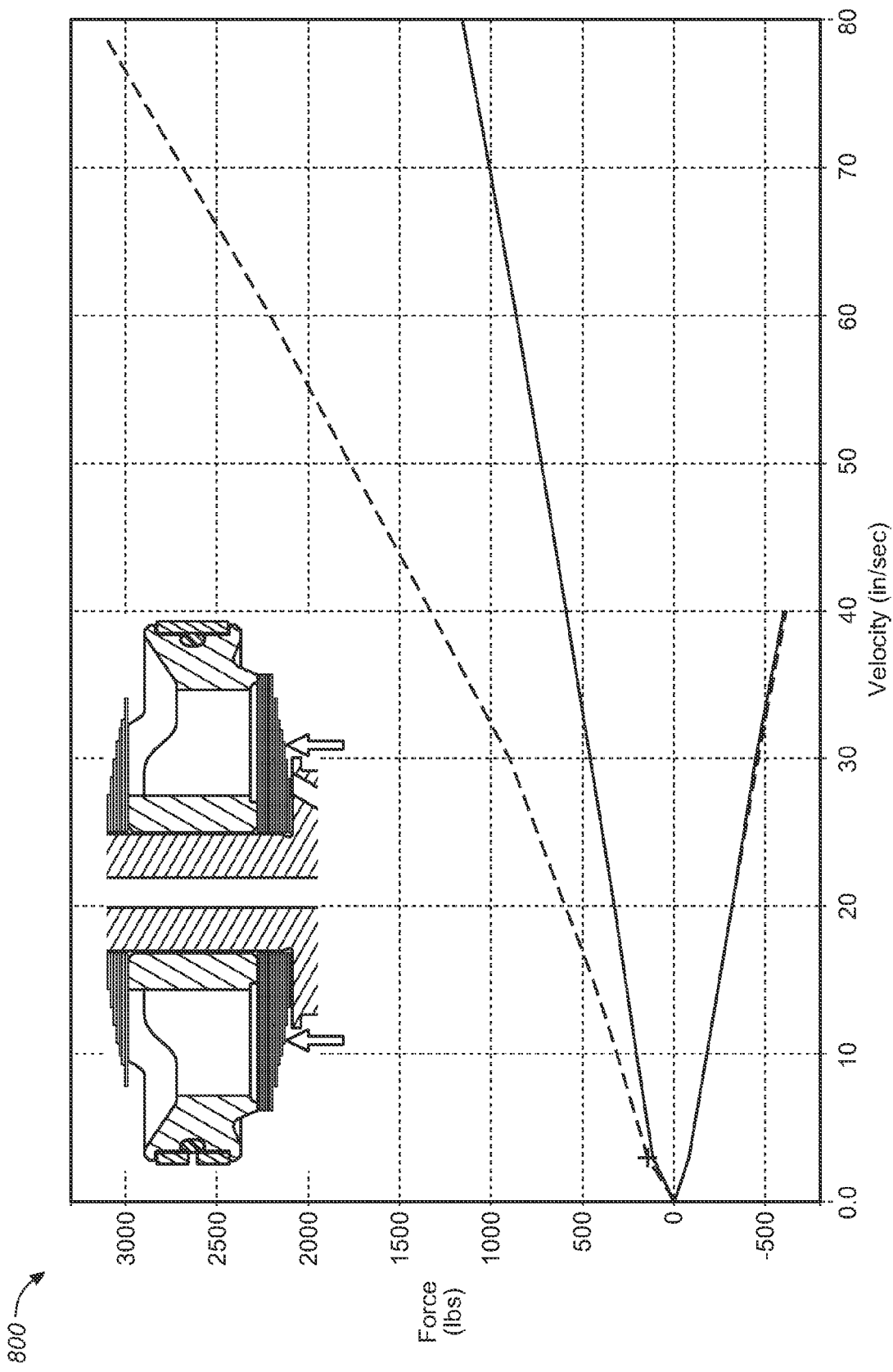
FIG. 8 is a graph of the force in pounds versus the velocity in inches-per-second, when the clamp presses on a comparatively smaller diameter valve shim than that pressed on in FIG. 7, in accordance with an embodiment.

FIG. 8 is a graph 800 of the force in pounds versus the velocity in inches-per-second, when clamp 640 presses on a comparatively smaller diameter valve shim than that pressed on in FIG. 7. This effectively causes the smaller diameter shim to become the "pivot shim", causing the boost cylinder 325 to have a second different characteristic. For example, in graph 700 and graph 800, the downward line in both graphs approaches the same velocity. However, the force demarcations in graph 700 are ⅔ths those of the force demarcations in graph 800.

Figure 9:
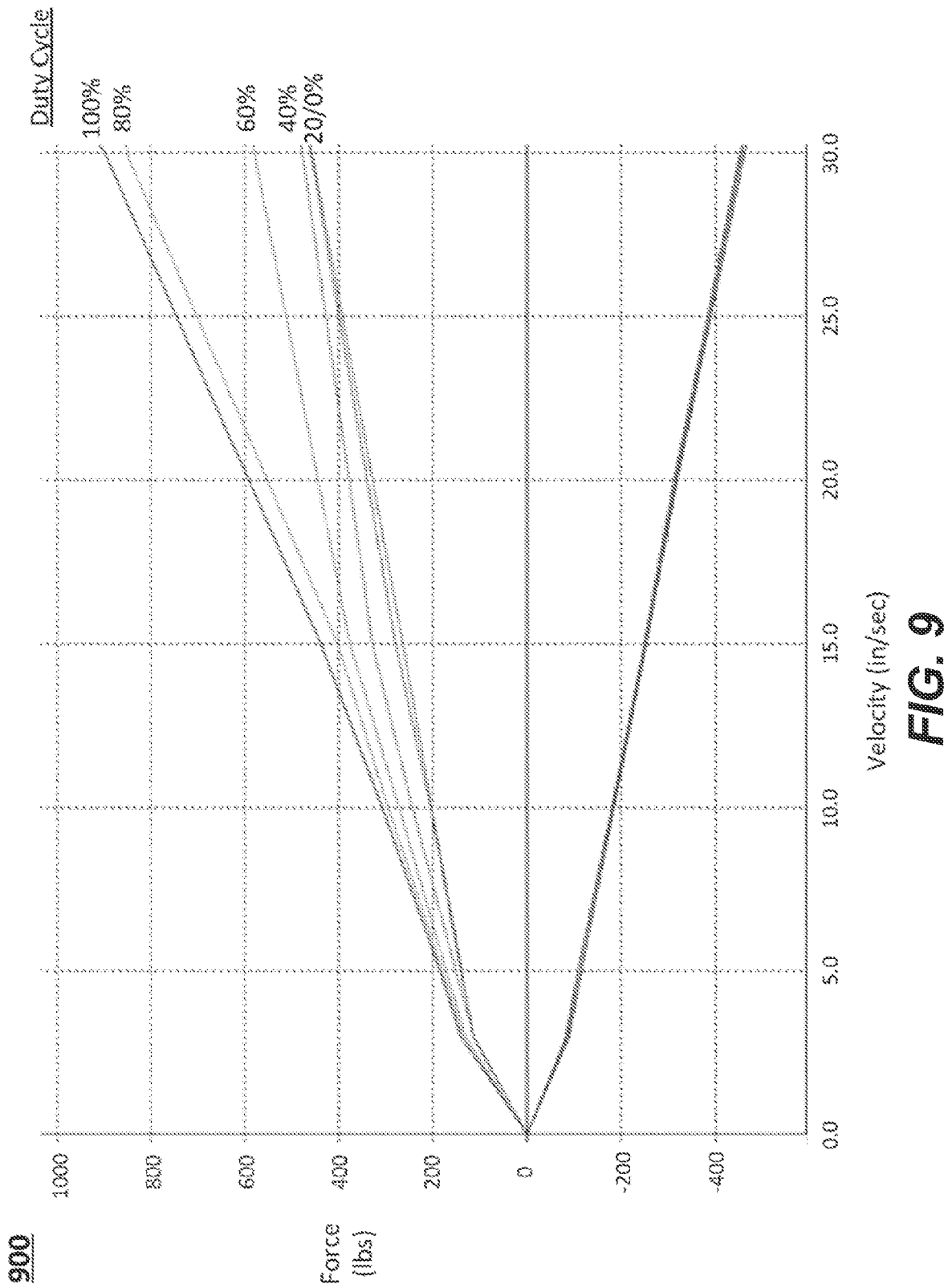
FIG. 9 is a graph of the force in pounds versus the velocity in inches-per-second, for a number of different duty cycle percentages, in accordance with an embodiment.

FIG. 9 is a graph 900 of the force in pounds versus the velocity in inches-per-second, for a number of different duty cycle percentages. That is, graph 900 illustrates pulse width modulation (PWM) signal w/dither across a variation of duty cycles with PWM to get proportional control range.

Figure 10:
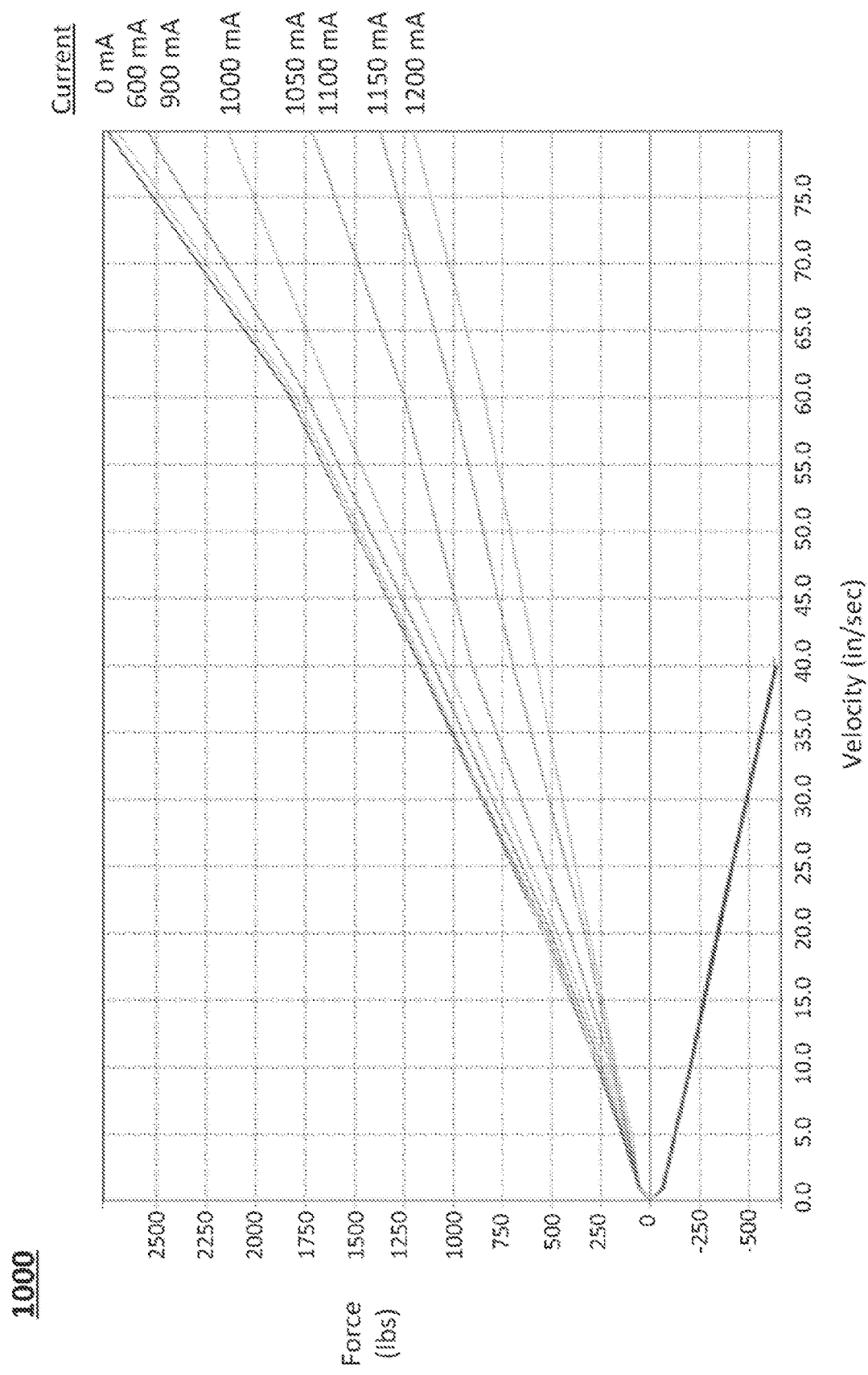
FIG. 10 is a graph of the force in pounds versus the velocity in inches-per-second, for a number of different currents, in accordance with an embodiment.

FIG. 10 is a graph 1000 of the force in pounds versus the velocity in inches-per-second, for a number of different currents, in accordance with an embodiment. In one embodiment, the current ranges from 0-1200 mA.

FIG. 11 is a side section view of a three section modular valve system in a main piston valve configuration including a modular active valve system 250 having a configuration similar to base valve 200 (e.g., active pilot valve 220 and main relief valve 210), and boost cylinder 325 operating independently of each other in a main piston valve 300 configuration of a damper assembly. In one embodiment, the modal boost cylinder configuration shown in FIG. 11 includes an upstream flow reducer 302 for tuning upstream pressure drop. In addition, in one embodiment, there is a post/top out 304 that is indexed with the boost cylinder to prevent rotation. The shaft 310 is also shown, and in one embodiment, the shaft 310 diameter is less than or equal to ⅞ inch. The components and operation of FIG. 11 are similar to that discussed in FIGS. 2 and 3 and, as such, the description and operation is not repeated for purposes of clarity.

Figure 12:
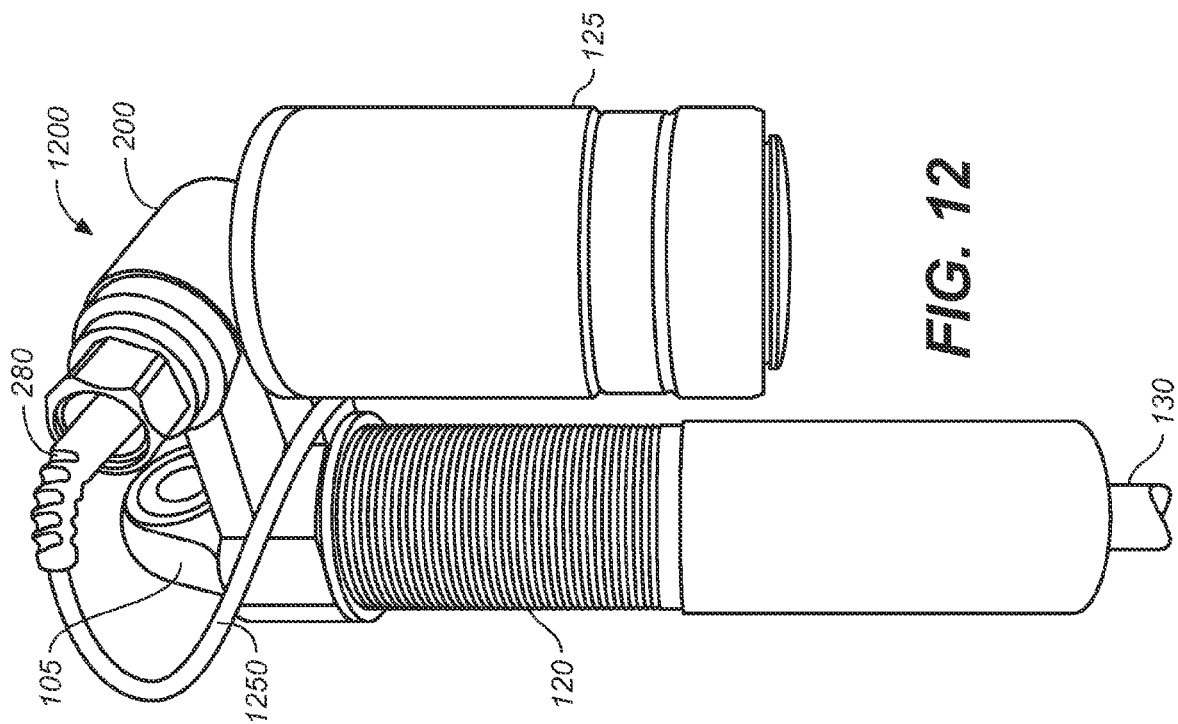
FIG. 12 is a perspective view of the modular active valve system in a damper having a reduced footprint for use in a smaller shock platform, in accordance with an embodiment.

With reference now to FIG. 12, a perspective view 1200 of the modular active valve system having a reduced footprint for use in a smaller shock platform installed in a smaller damping assembly is shown in accordance with an embodiment. Similar to FIGS. 1A and 1B, in one embodiment, the damping assembly includes eyelet 105, damper housing 120, external fluid reservoir 125, base valve 200, piston shaft 130, strain relief 280, and control wire 1250. In one embodiment, control wire 1250 allows a controller to communicate with base valve 200. In one embodiment, the length of strain relief 280 is different depending upon space, footprint, or other manufacturing or use reasons. In one embodiment, there may be no strain relief 280 at all.

Figure 13:
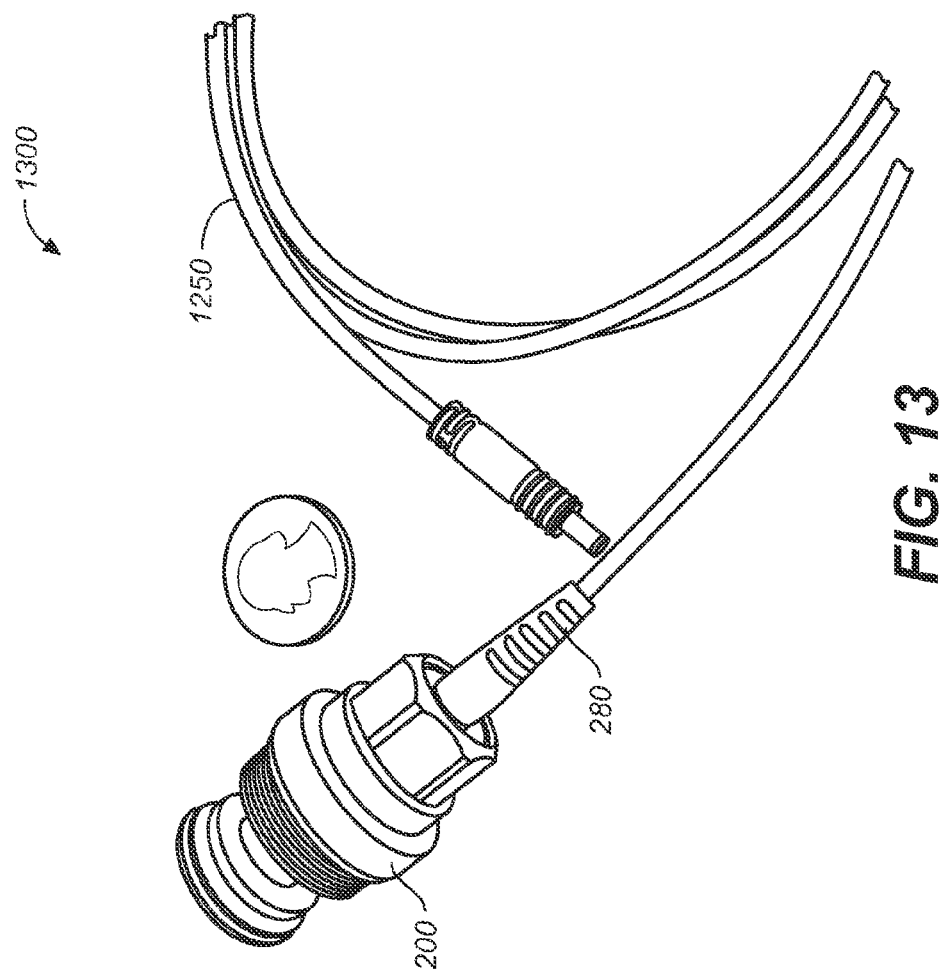
FIG. 13 is a perspective view of the modular active base valve with a control wire, in accordance with an embodiment.

FIG. 13 is a perspective view 1300 of a base valve 200, in accordance with an embodiment. In one embodiment, view 1300 also includes strain relief 280, a control wire 1250, and a United States Quarter as an example of the size of the base valve 200. In one embodiment, control wire 1250 allows a controller to communicate with base valve 200. In one embodiment, the length of strain relief 280 is different depending upon space, footprint, or other manufacturing or use reasons. In one embodiment, there may be no strain relief 280 at all. IN one embodiment, since the base valve 200 is modular, the size is also adjustable to fit some, most, or all base valve sizes.

Figure 14:
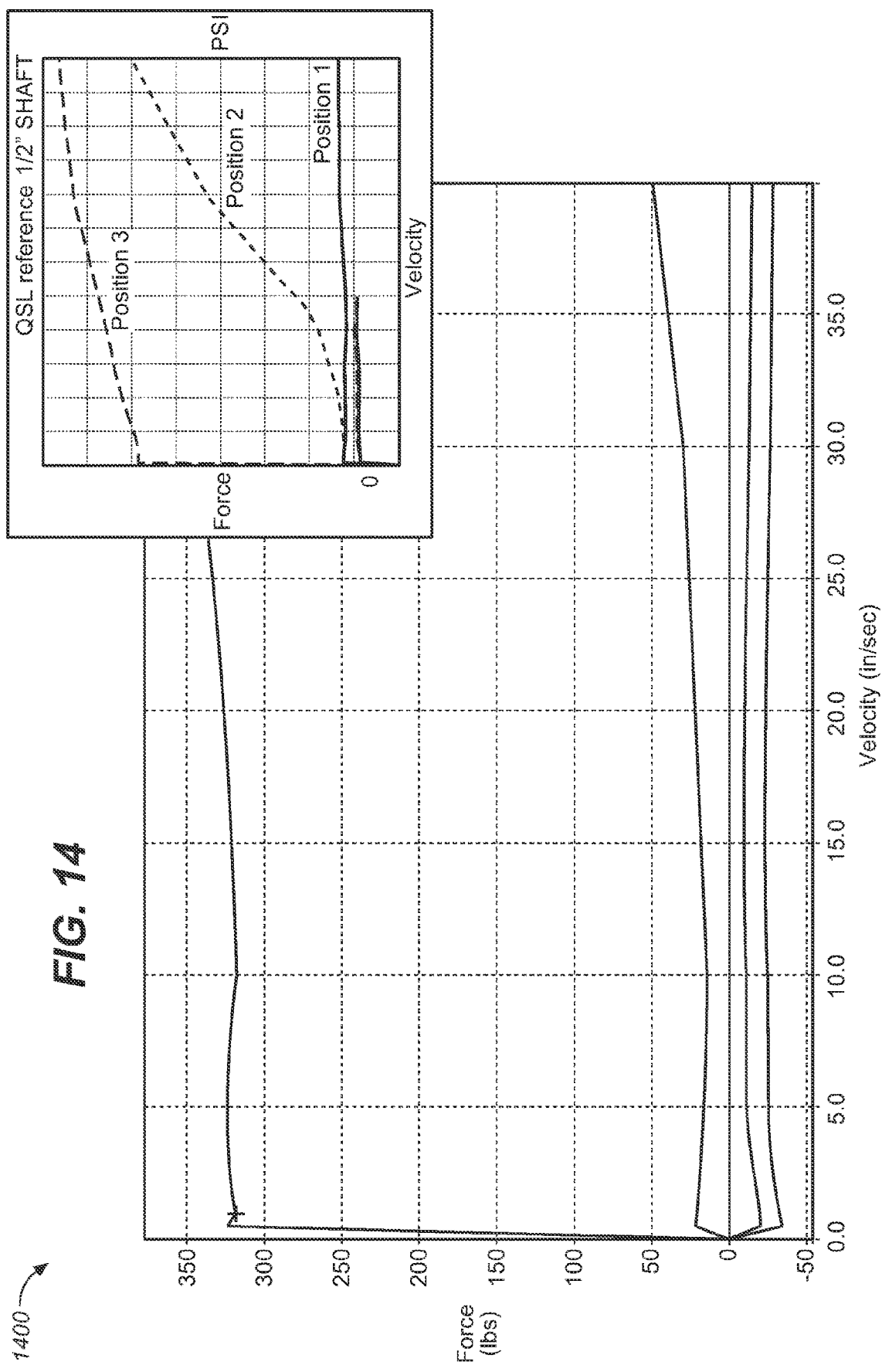
FIG. 14 is a graph of dyno data of the force in pounds versus the velocity in inches-per-second comparing the modular active valve system having a reduced footprint for use in a smaller shock platform with a current quick switch lockout (QSL), in accordance with an embodiment.

FIG. 14 is a graph of dyno data of the force in pounds versus the velocity in inches-per-second comparing the modular active valve system having a reduced footprint for use in a smaller shock platform with a current quick switch lockout (QSL). In one embodiment, graph 1400 uses an increase in PSI to deliver the different results.

Figure 15:
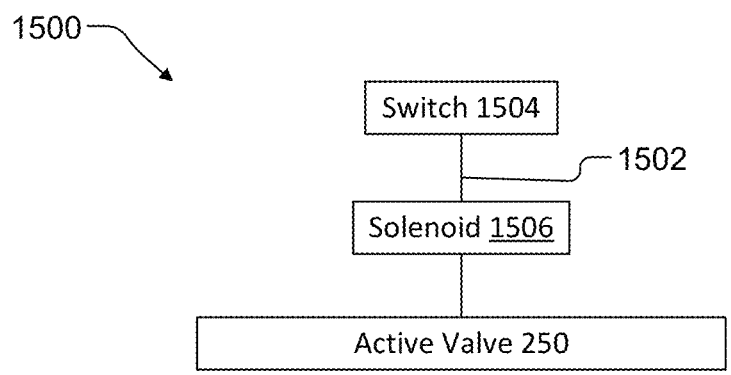
FIG. 15 is a schematic diagram showing a control arrangement for an active valve, in accordance with an embodiment.

FIG. 15 is a schematic diagram showing a control arrangement 1500 for a remotely-operated active valve, e.g., active pilot valve 220. As illustrated, a signal line 1502 runs from a switch 1504 to a solenoid 1506. Thereafter, the solenoid 1506 converts electrical energy into mechanical movement and rotates a body within active pilot valve 220. In one embodiment, the rotation of the body causes an indexing ring consisting of two opposing, outwardly spring-biased balls to rotate among indentions formed on an inside diameter of a lock ring.

As the body rotates, a nipple at an opposite end of the active pilot valve 220 is advanced or withdrawn from an opening in at least one orifice. For example, the body is rotationally engaged with the nipple. A male hex member extends from an end of the body into a female hex profile bore formed in the nipple. Such engagement transmits rotation from the body to the nipple while allowing axial displacement of the nipple relative to the body. Therefore, while the body does not axially move upon rotation, the threaded nipple interacts with mating threads formed on an inside diameter of the bore to transmit axial motion, resulting from rotation and based on the pitch of the threads, of the nipple towards or away from at least one orifice, between a closed position, a partially open position, and a fully or completely open position.

Adjusting the opening of the orifice modifies the flowrate of the fluid therethrough and in so doing varies the stiffness of a corresponding damping assembly 100. While FIG. 15 is simplified and involves control of a single active pilot valve 220, it will be understood that any number of active valves corresponding to any number of fluid channels for a corresponding number of vehicle suspension dampers could be used alone or in combination. That is, one or more active valves could be operated simultaneously or separately depending upon needs in a vehicular suspension system. For example, a suspension damper could have one, a combination of, or each of an active valve(s): for a base valve, a main piston valve, or the like. In other words, anywhere there is a fluid flow path within a damping assembly 100, an active valve could be used. Moreover, the active valve could be alone or used in combination with other active valves at other fluid flow paths to automate one or more of the damping performance characteristics of the damping assembly. Moreover, additional switches could permit individual operation of separate active bottom out valves.

As discussed, active pilot valve 220 is particularly useful with a vehicle used in different conditions. In off-road applications, compliant damping is necessary as the vehicle relies on its suspension when encountering off-road obstacles. However, operating a vehicle with very compliant suspension on a smooth road at road speeds can be problematic due to the springiness/sponginess of the suspension and corresponding vehicle handling problems, loss of energy from drive to suspension, and the like. Such compliance can cause reduced power making it to the drive wheel, reduced performance, and the like. Such control issues can be pronounced when cornering at high speed as a vehicle with a soft suspension may tend to increase drag, provide excessive pitch and yaw during braking and/or acceleration, and the like. With the remotely-operated active pilot valve 220, the working size of an orifice is automatically adjusted thereby modifying the communication of fluid within damping assembly 100. Correspondingly, the damping characteristics of damping assembly 100 can be changed on-the-fly.

Figure 16:
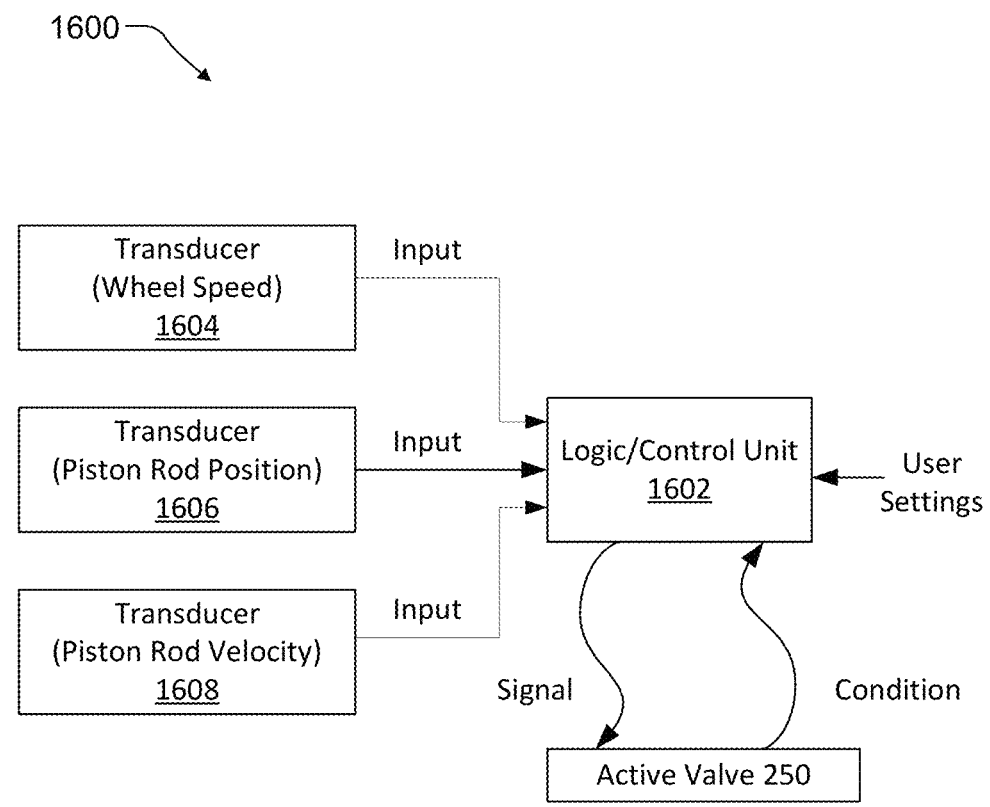
FIG. 16 is a schematic diagram of a control system based upon any or all of vehicle speed, damper rod speed, and damper rod position, in accordance with an embodiment.

In addition to, or in lieu of, the simple, switch-operated remote arrangement of FIG. 15, the remotely-operable active pilot valve 220 can be operated automatically based upon one or more performance conditions. FIG. 16 shows a schematic diagram of a control system 1600 based upon any or all of vehicle speed, damper rod speed, and damper rod position. One embodiment of the arrangement of FIG. 16 is designed to automatically increase damping in a damping assembly 100 in the event a damper rod reaches a certain velocity in its travel towards the bottom end of a damper at a predetermined speed of the vehicle. In one embodiment, the control system 1600 adds damping (and control) in the event of rapid operation (e.g. high rod velocity) of the damping assembly 100 to avoid a bottoming out of the damper rod as well as a loss of control that can accompany rapid compression of a damping assembly 100 with a relative long amount of travel. In one embodiment, the control system 1600 adds damping (e.g., adjusts the size of the opening of an orifice by causing the nipple to open, close, or partially close the orifice) in the event that the rod velocity in compression is relatively low but the rod progresses past a certain point in the travel.

FIG. 16 illustrates, for example, a control system 1600 including three variables: wheel speed, corresponding to the speed of a vehicle component (measured by wheel speed transducer 1604), piston rod position (measured by piston rod position transducer 1606), and piston rod velocity (measured by piston rod velocity transducer 1608). Any or all of the variables shown may be considered by logic unit 1602 in controlling the solenoids or other motive sources coupled to active pilot valve 220 for changing the working size of the opening of the orifice by causing the nipple to open, close, or partially close the orifice. Any other suitable vehicle operation variable may be used in addition to or in lieu of the variables discussed herein, such as, for example, piston rod compression strain, eyelet strain, vehicle mounted accelerometer (or tilt/inclinometer) data, or any other suitable vehicle or component performance data.

In one embodiment, the piston's position within the damping chamber is determined using an accelerometer to sense modal resonance of the suspension damper. Such resonance will change depending on the position of the piston and an on-board processor (computer) is calibrated to correlate resonance with axial position. In one embodiment, a suitable proximity sensor or linear coil transducer or other electro-magnetic transducer is incorporated in the damping chamber to provide a sensor to monitor the position and/or speed of the piston (and suitable magnetic tag) with respect to a housing of the suspension damper.

In one embodiment, the magnetic transducer includes a waveguide and a magnet, such as a doughnut (toroidal) magnet that is joined to the cylinder and oriented such that the magnetic field generated by the magnet passes through the rod and the waveguide. Electric pulses are applied to the waveguide from a pulse generator that provides a stream of electric pulses, each of which is also provided to a signal processing circuit for timing purposes. When the electric pulse is applied to the waveguide, a magnetic field is formed surrounding the waveguide. Interaction of this field with the magnetic field from the magnet causes a torsional strain wave pulse to be launched in the waveguide in both directions away from the magnet. A coil assembly and sensing tape is joined to the waveguide. The strain wave causes a dynamic effect in the permeability of the sensing tape which is biased with a permanent magnetic field by the magnet. The dynamic effect in the magnetic field of the coil assembly due to the strain wave pulse, results in an output signal from the coil assembly that is provided to the signal processing circuit along signal lines.

By comparing the time of application of a particular electric pulse and a time of return of a sonic torsional strain wave pulse back along the waveguide, the signal processing circuit can calculate a distance of the magnet from the coil assembly or the relative velocity between the waveguide and the magnet. The signal processing circuit provides an output signal, which is digital or analog, proportional to the calculated distance and/or velocity. A transducer-operated arrangement for measuring piston rod speed and velocity is described in U.S. Pat. No. 5,952,823 and that patent is incorporated by reference herein in its entirety.

While transducers located at the suspension damper measure piston rod velocity (piston rod velocity transducer 1608), and piston rod position (piston rod position transducer 1606), a separate wheel speed transducer 1604 for sensing the rotational speed of a wheel about an axle includes housing fixed to the axle and containing therein, for example, two permanent magnets. In one embodiment, the magnets are arranged such that an elongated pole piece commonly abuts first surfaces of each of the magnets, such surfaces being of like polarity. Two inductive coils having flux-conductive cores axially passing therethrough abut each of the magnets on second surfaces thereof, the second surfaces of the magnets again being of like polarity with respect to each other and of opposite polarity with respect to the first surfaces. Wheel speed transducers are described in U.S. Pat. No. 3,986,118 which is incorporated herein by reference in its entirety.

In one embodiment, as illustrated in FIG. 16, the logic unit 1602 with user-definable settings receives inputs from piston rod position transducer 1606, piston rod velocity transducer 1608, as well as wheel speed transducer 1604. Logic unit 1602 is user-programmable and, depending on the needs of the operator, logic unit 1602 records the variables and, then, if certain criteria are met, logic unit 1602 sends its own signal to active pilot valve 220 (e.g., the logic unit 1602 is an activation signal provider) to cause active pilot valve 220 to move into the desired state (e.g., adjust the flow rate by adjusting the distance between the nipple and the orifice). Thereafter, the condition, state, or position of active pilot valve 220 is relayed back to logic unit 1602 via an active valve monitor or the like.

In one embodiment, logic unit 1602 shown in FIG. 16 assumes a single active pilot valve 220 corresponding to a single orifice of a single damping assembly 100, but logic unit 1602 is usable with any number of active valves or groups of active valves corresponding to any number of orifices, or groups of orifices.

While the examples illustrated relate to manual operation and automated operation based upon specific parameters, active pilot valve 220 can be remotely-operated and can be used in a variety of ways with many different variables. For example, a transducer, such as an accelerometer, can measure other aspects of the vehicle's suspension system, like axle force and/or moments applied to various parts, and direct change to position of active pilot valve 220 (and corresponding change to the working size of the opening of the orifice by causing the nipple to open, close, or partially close the orifice) in response thereto. In another example, active pilot valve 220 is controlled at least in part by a suspension travel transducer measuring suspension travel and adding damping characteristics to some or all of the suspension damper(s) in the event of, for example, an increased or decreased suspension travel reading that may be due to a jump, a landing, a bump, or the like.

Figure 17:
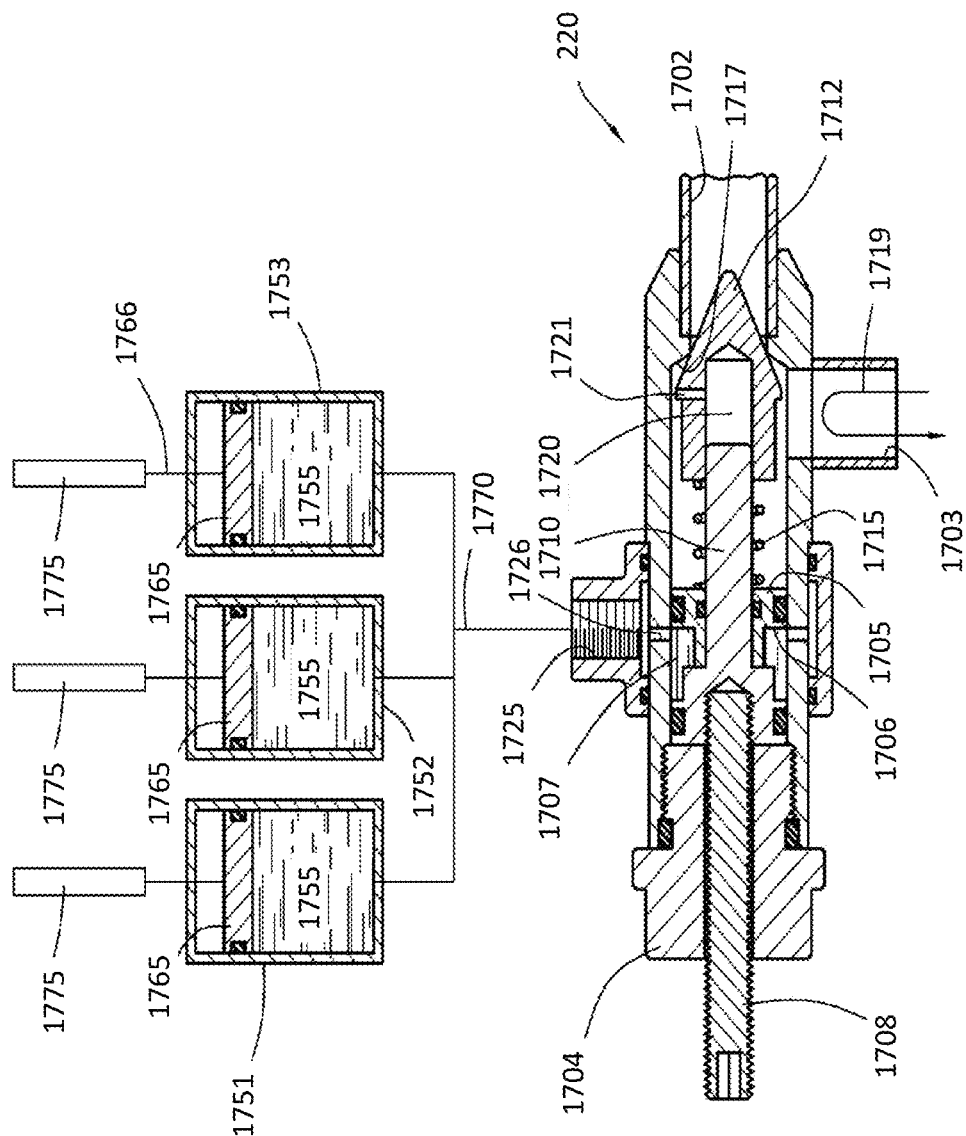
FIG. 17 is an enlarged section view showing an active bottom out valve and a plurality of valve operating cylinders in selective communication with an annular piston surface of the valve, in accordance with an embodiment.

FIG. 17 is an enlarged view showing an embodiment of a remotely operable active pilot valve 220. Although FIG. 17 shows the active pilot valve 220 in a closed position (e.g. during a rebound stroke of the damper), the following discussion also includes the opening of active pilot valve 220. Active pilot valve 220 includes a valve body 1704 housing a movable piston 1705 which is sealed within the body. The piston 1705 includes a sealed chamber 1707 adjacent an annularly-shaped piston surface 1706 at a first end thereof. The chamber 1707 and annular piston surface 1706 are in fluid communication with a port 1725 accessed via opening 1726. Two additional fluid communication points are provided in the body including an inlet 1702 and an outlet 1703 for fluid passing through the active pilot valve 220.

Extending from a first end of the piston 1705 is a shaft 1710 having a cone-shaped valve member 1712 (other shapes such as spherical or flat, with corresponding seats, will also work suitably well) disposed on an end thereof. The cone-shaped member 1712 is telescopically mounted relative to, and movable on, the shaft 1710 and is biased toward an extended position due to a spring 1715 coaxially mounted on the shaft 1710 between the member 1712 and the piston 1705. Due to the spring biasing, the cone-shaped member 1712 normally seats itself against a valve seat 1717 formed in an interior of the valve body 1704.

As shown, the cone shaped member 1712 is seated against valve seat 1717 due to the force of the spring 1715 and absent an opposite force from fluid entering the active pilot valve 220 along the orifice. As member 1712 telescopes out, a gap 1720 is formed between the end of the shaft 1710 and an interior of member 1712. A vent 1721 is provided to relieve any pressure formed in the gap. With a fluid path through the active pilot valve 220 (from 1703 to 1702) closed, fluid communication is substantially shut off from the rebound side of the cylinder into the valve body (and hence through the bottom out back to the compression side) and its "dead-end" path is shown by arrow 1719.

In one embodiment, there is a manual pre-load adjustment on the spring 1715 permitting a user to hand-load or un-load the spring using a threaded member 1708 that transmits motion of the piston 1705 towards and away from the conical member, thereby changing the compression on the spring 1715.

Also shown in FIG. 17 is a plurality of valve operating cylinders 1751, 1752, 1753. In one embodiment, the cylinders each include a predetermined volume of fluid 1755 that is selectively movable in and out of each cylindrical body through the action of a separate corresponding piston 1765 and rod 1766 for each cylindrical body. A fluid path 1770 runs between each cylinder and port 1725 of the valve body where annular piston surface 1706 is exposed to the fluid.

Because each cylinder has a specific volume of substantially incompressible fluid and because the volume of the sealed chamber 1707 adjacent the annular piston surface 1706 is known, the fluid contents of each cylinder can be used, individually, sequentially or simultaneously to move the piston a specific distance, thereby effecting the damping characteristics of the system in a relatively predetermined and precise way.

While the cylinders 1751-1753 can be operated in any fashion, in the embodiment shown each piston 1765 and rod 1766 is individually operated by a solenoid 1775 and each solenoid, in turn, is operable from a remote location of the vehicle, like a handlebar area of a bicycle, motorcycle, or the cab of a motor vehicle (or any location on any number of different vehicles to which the embodiments could be deployed). Electrical power to the solenoids 1775 is available from an existing power source of a vehicle or is supplied from its own source, such as on-board batteries. Because the cylinders may be operated by battery or other electric power or even manually (e.g. by syringe type plunger), there is no requirement that a so-equipped suspension rely on any pressurized vehicle hydraulic system (e.g. steering, brakes) for operation. Further, because of the fixed volume interaction with the bottom out valve there is no issue involved in stepping from hydraulic system pressure to desired suspension bottom out operating pressure.

In one embodiment, e.g., when active pilot valve 220 is in the damping-open position, fluid flow through the orifice provides adequate force on the member 1712 to urge it backwards, at least partially loading the spring 1715 and creating fluid path 1701 from the orifice into a rebound portion of the vehicle damping assembly 100.

The characteristics of the spring 1715 are typically chosen to permit active pilot valve 220 (e.g. member 1712) to open at a predetermined pressure, with a predetermined amount of control pressure applied to port 1725, during a compression stroke of vehicle damping assembly 100. For a given spring 1715, higher control pressure at port 1725 will result in higher bottom out pressure required to open the active pilot valve 220 and correspondingly higher damping resistance in the orifice (more compression damping due to the bottom out). In one embodiment, the control pressure at port 1725 is raised high enough to effectively "lock" the bottom out closed resulting in a substantially rigid compression damper (particularly true when a solid damping piston is also used).

In one embodiment, the valve is open in both directions when the valve member 1712 is "topped out" against valve body 1704. In another embodiment however, when the valve piston 1705 is abutted or "topped out" against valve body 1704 the spring 1715 and relative dimensions of the active pilot valve 220 still allow for the cone member 1712 to engage the valve seat 1717 thereby closing the valve. In such embodiment backflow from the rebound side of the chamber 1707 to the compression side is always substantially closed and cracking pressure from flow along the orifice is determined by the pre-compression in the spring 1715. In such embodiment, additional fluid pressure may be added to the inlet through port 1725 to increase the cracking pressure for flow along the orifice and thereby increase compression damping through the bottom out over that value provided by the spring compression "topped out." It is generally noteworthy that while the descriptions herein often relate to compression damping bottom out and rebound shut off, some or all of the channel(s) on a given suspension unit may be configured to allow rebound damping and shut off or impede compression damping.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments could be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What I claim is:

1. A multi-stage valve comprising:
a first stage; and
at least a second stage,
wherein at least the first stage comprises a semi-active valve for electronic damping control, and
wherein:
   the first stage comprises a pilot valve;
   the second stage comprises a main relief valve;
   the pilot valve configured to provide an electronically adjustable fluid pressure to the main relief valve;
   the main relief valve configured to modify a firmness of a damper based on the electronically adjustable fluid pressure received from the pilot valve; and
   a third stage comprising a boost cylinder, the boost cylinder configured to modify said firmness of said damper based on the electronically adjustable fluid pressure received from the pilot valve, said boost cylinder further comprising:
   a shim stack comprised of a plurality of shims; and
   a clamp configured to contact at least one of said plurality of shims, wherein a damping range of said boost cylinder is adjusted by modifying which of said plurality of shims is in contact with said clamp.

2. A multi-stage base valve comprising:
a first stage; and
at least a second stage,
wherein at least the first stage comprises a semi-active valve for electronic damping control, and the second stage comprises a boost cylinder;
the first stage configured to provide an electronically adjustable fluid pressure to the boost cylinder; and
the boost cylinder configured to modify a firmness of a damper based on the electronically adjustable fluid pressure received from the first stage, said boost cylinder further comprising:
   a shim stack comprised of a plurality of shims; and
   a clamp configured to contact at least one of said plurality of shims, wherein a damping range of said boost cylinder is adjusted by modifying which of said plurality of shims is in contact with said clamp.

3. The multi-stage base valve of claim 2 wherein the first stage is a spool type pilot valve.

4. The multi-stage base valve of claim 2 wherein the first stage is a poppet type pilot valve.

5. A multi-stage valve comprising:
a first stage; and
at least a second stage,
wherein at least the first stage comprises a semi-active valve for electronic damping control, and
wherein:
   the first stage comprises a pilot valve;
   the second stage comprises a boost cylinder;
   the pilot valve configured to provide an electronically adjustable fluid pressure to the boost cylinder; and
   the boost cylinder configured to modify a firmness of a damper based on the electronically adjustable fluid pressure received from the pilot valve, said boost cylinder further comprising:
   a shim stack comprised of a plurality of shims; and
   a clamp configured to contact at least one of said plurality of shims, wherein a damping range of said boost cylinder is adjusted by modifying which of said plurality of shims is in contact with said clamp.

6. The multi-stage valve of claim 5, further comprising:
a third stage comprising a main relief valve, the main relief valve configured to modify said firmness of said damper based on the electronically adjustable fluid pressure received from the pilot valve.

* * * * *